United States Patent [19]

Hiro et al.

[11] Patent Number: 4,551,404
[45] Date of Patent: Nov. 5, 1985

[54] DISAZO ELECTROPHOTOGRAPHIC PHOTOSENSITIVE MEMBER

[75] Inventors: Masaaki Hiro, Kawasaki; Yoshio Takasu, Tama; Shozo Ishikawa, Yokohama; Kazuharu Katagiri, Yokohama; Hideyuki Takahashi, Yokohama, all of Japan

[73] Assignees: Canon Kabushiki Kaisha; Copyer Kabushiki Kaisha, both of Tokyo, Japan

[21] Appl. No.: 406,313

[22] Filed: Aug. 9, 1982

[30] Foreign Application Priority Data

| Jun. 18, 1981 | [JP] | Japan | 56-129162 |
| Aug. 18, 1981 | [JP] | Japan | 56-129164 |
| Aug. 18, 1981 | [JP] | Japan | 56-129165 |
| Aug. 18, 1981 | [JP] | Japan | 56-129166 |
| Aug. 19, 1981 | [JP] | Japan | 56-130765 |
| Aug. 19, 1981 | [JP] | Japan | 56-130766 |
| Sep. 7, 1981  | [JP] | Japan | 56-141439 |
| Oct. 5, 1981  | [JP] | Japan | 56-158478 |
| Oct. 5, 1981  | [JP] | Japan | 56-158479 |
| Nov. 25, 1981 | [JP] | Japan | 56-188908 |
| Nov. 26, 1981 | [JP] | Japan | 56-190036 |

[51] Int. Cl.$^4$ ............... G03G 5/06; G03G 5/14
[52] U.S. Cl. ........................... 430/59; 430/58; 430/72; 430/73; 430/74; 430/75; 430/76; 430/77; 430/78; 430/79
[58] Field of Search ............ 430/56, 59, 72, 73, 430/74, 75, 76, 77, 78, 79; 260/152, 157, 164, 169, 174

[56] References Cited

U.S. PATENT DOCUMENTS

| 4,251,613 | 2/1981  | Sasaki et al.    | 430/58 X |
| 4,251,614 | 2/1981  | Sasaki et al.    | 430/58 X |
| 4,279,981 | 7/1981  | Ohta et al.      | 430/58 X |
| 4,299,896 | 11/1981 | Hashimoto et al. | 430/75 X |
| 4,349,616 | 9/1982  | Sasaki           | 430/58   |
| 4,359,513 | 11/1982 | Katagiri et al.  | 430/58   |
| 4,363,859 | 12/1982 | Sasaki et al.    | 430/59   |
| 4,399,206 | 8/1983  | Katagiri et al.  | 430/75 X |
| 4,419,428 | 12/1983 | Katagiri et al.  | 430/77   |

FOREIGN PATENT DOCUMENTS

| 56-46237 | 4/1981 | Japan | 260/152 |
| 57-90635 | 6/1982 | Japan | 260/157 |

Primary Examiner—Roland E. Martin
Attorney, Agent, or Firm—Fitzpatrick, Cella, Harper & Scinto

[57] ABSTRACT

An electrophotographic photosensitive member characterized by containing at least one azo pigment represented by the following formula (1), (2), or (3):

$$(C_p-N=N)_{\overline{2}}A_1 \tag{1}$$

-continued

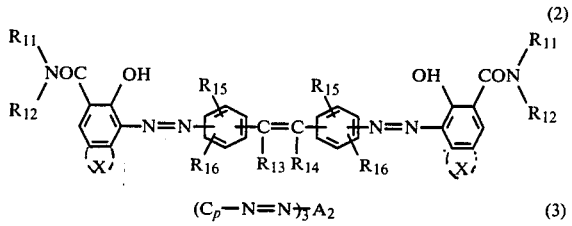
(2)

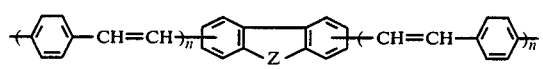

(3)

In these formulae;

$A_1$:

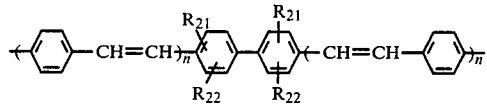

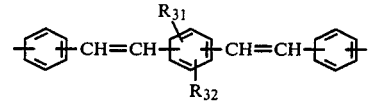

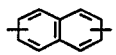

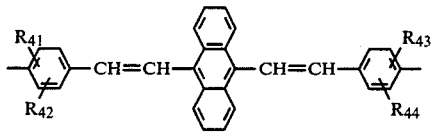

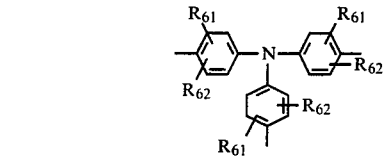

$A_2$:

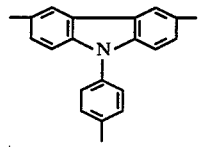

wherein Z represents (Abstract continued on next page.)

Cp:

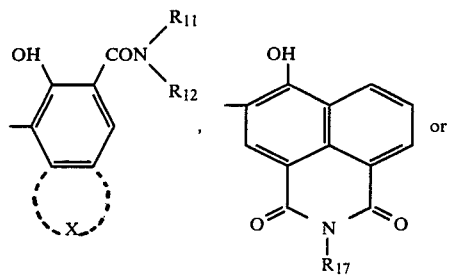

, 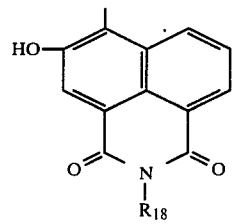 or

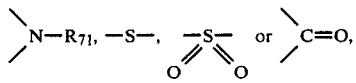

in which $R_{71}$ is hydrogen, or substituted or unsubstituted alkyl; n is 0 or 1; $R_{21}$, $R_{22}$, $R_{61}$ and $R_{62}$ represent hydrogen, alkyl, alkoxy, nitro, or hydroxyl $R_{31}$ and $R_{32}$ represent hydrogen or alkoxy; and $R_{41}$, $R_{42}$, $R_{43}$, $R_{44}$, $R_{51}$, $R_{52}$, $R_{53}$ and $R_{54}$ represent hydrogen, halogen, or organic monovalent residue.

wherein X represents a residue necessary for completing an aromatic hydrocarbon ring or a heterocyclic ring, each ring being substituted or unsubstituted; $R_{11}$ represents hydrogen or alkyl; $R_{12}$ represents methyl, ethyl or $C_3$–$C_8$ linear alkyl; and $R_{17}$ and $R_{18}$ represent alkyl, aralkyl or aryl, each substituted or unsubstituted. In formula (2), $R_{11}$, $R_{12}$ and X are as defined above; $R_{13}$ and $R_{14}$ represent hydrogen or cyano; and $R_{15}$ and $R_{16}$ represent hydrogen, halogen, alkyl, alkoxy, nitro or hydroxyl.

15 Claims, No Drawings

DISAZO ELECTROPHOTOGRAPHIC PHOTOSENSITIVE MEMBER

BACKGROUND OF THE INVENTION

1. Field of the Invention

This invention relates to electrophotographic photosensitive members and more particularly to an electrophotographic photosensitive member containing a specific azo pigment having photoconductivity.

2. Description of the Prior Art

Inorganic photoconductive materials such as, selenium, cadmium sulfide, zinc oxide, etc. have so far been widely used for electrophotographic photosensitive members.

On the other hand, various organic photoconductive materials for use in electrophotographic photosensitive members are known, including photoconductive polymers, a typical example thereof being poly(N-vinylcarbazole), low molecular weight organic photoconductive materials such as 2,5-bis(p-diethylaminophenyl)-1,3,4-oxadiazole, and further combinations of such organic photoconductive materials with various types of dyes or pigments.

Organic photoconductive materials, because of their good film forming property, can be used by simple coating for producing electrophotographic photosensitive members with much high productivity, thus giving inexpensive photosensitive members. Further, color sensitivity of organic photoconductive material-containing photosensitive members can be freely controlled by selection of the sensitizer to be used from a wide variety of dyes and pigments. Having such advantages, organic photoconductive materials have been inverstigated extensively. However, photosensitive members employing organic photoconductive materials are disadvantageous in sensitivity and durability, so that a very few of them have been put into practical use.

SUMMARY OF THE INVENTION

An object of this invention is to provide an electrophotographic photosensitive member containing a specific azo pigment.

Another object of this invention is to provide an electrophotographic photosensitive member having high sensitivity.

Still another object of this invention is to provide an electrophotographic photosensitive member having high durability.

These objects of this invention can be achieved with an electrophotographic photosensitive member containing at least one photoconductive azo pigment represented by the following formula (1), (2), or (3):

$(Cp-N=N)_2 A_1$  Formula (1)

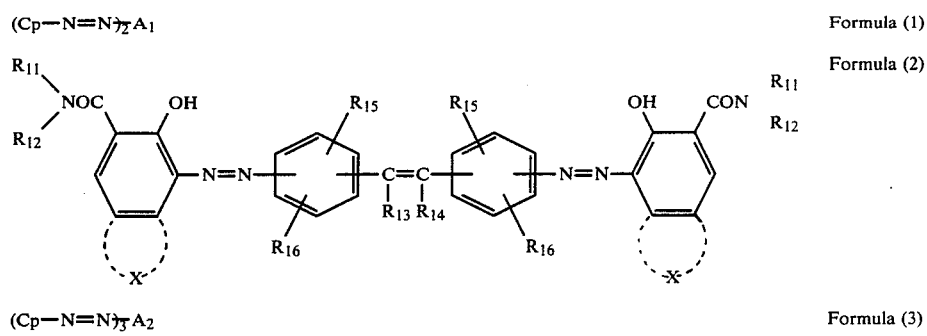

Formula (2)

$(Cp-N=N)_3 A_2$  Formula (3)

In these formulae;

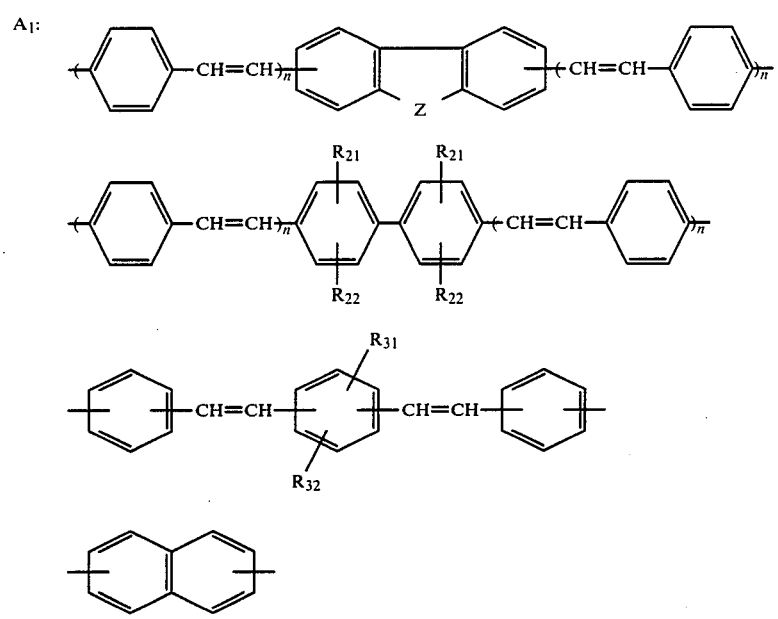

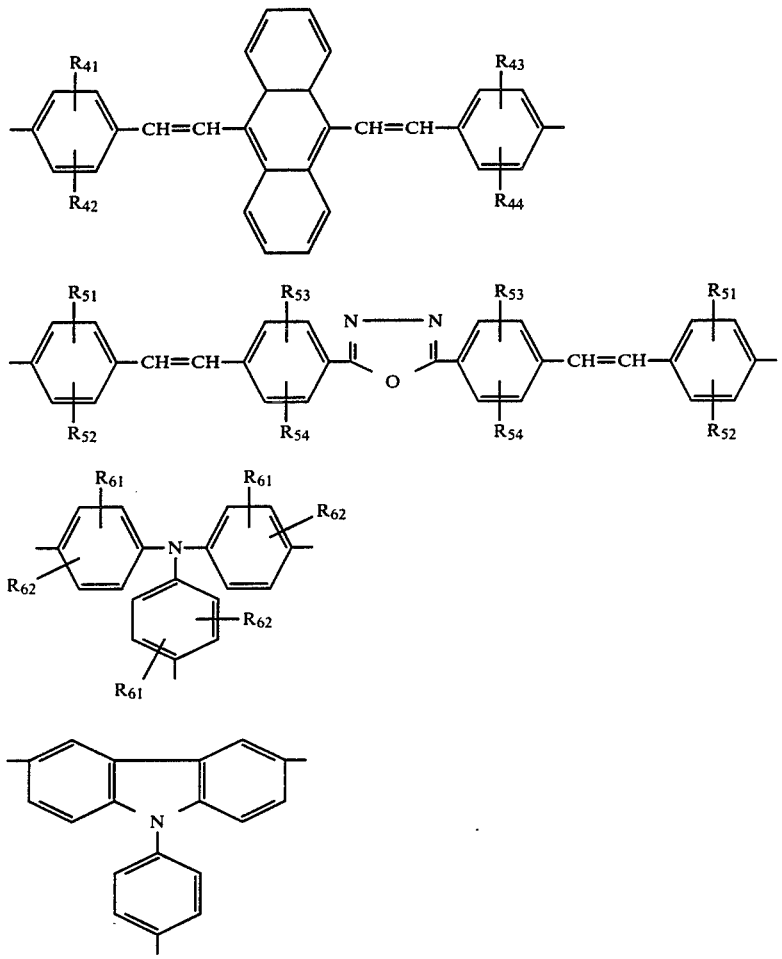

In $A_1$ and $A_2$; Z represents

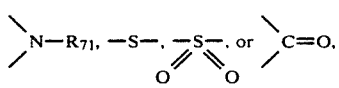

wherein $R_{71}$ is hydrogen, or substituted or unsubstituted alkyl;

n is 0 or 1;

$R_{21}$, $R_{22}$, $R_{61}$, and $R_{62}$ represent hydrogen, alkyl, alkoxy, nitro, or hydroxyl;

$R_{31}$ and $R_{32}$ represent hydrogen or alkoxy; and $R_{41}$, $R_{42}$, $R_{43}$, $R_{44}$, $R_{51}$, $R_{52}$, $R_{53}$, and $R_{54}$ represent hydrogen, halogen, or organic monovalent residue.

Cp:
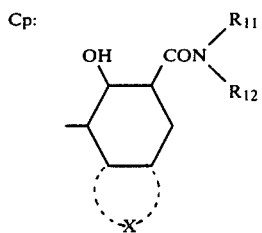

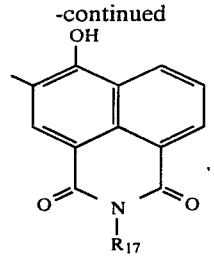

or

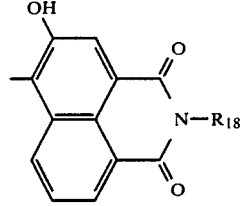

In Cp; X represents a residue necessary for completing an aromatic hydrocarbon ring or a heterocyclic ring, each ring being substituted or unsubstituted;

$R_{11}$ represents hydrogen or alkyl;

$R_{12}$ represents methyl, ethyl, or $C_3$–$C_8$ linear alkyl; and $R_{17}$ and $R_{18}$ represent alkyl, aralkyl, or aryl, each substituted or unsubstituted.

In formula (2); $R_{11}$, $R_{12}$ and X are as defined above; $R_{13}$ and $R_{14}$ represent hydrogen or cyano; and $R_{15}$ and $R_{16}$ represent hydrogen, halogen, alkyl, alkoxy, nitro, or hydroxyl.

DETAILED DESCRIPTION OF THE INVENTION

The electrophotographic photosensitive member of this invention is characterized by containing at least one azo pigment represented by the formula (1), (2), or (3).

$(Cp-N=N)_{\overline{2}}A_1$  Formula (1)

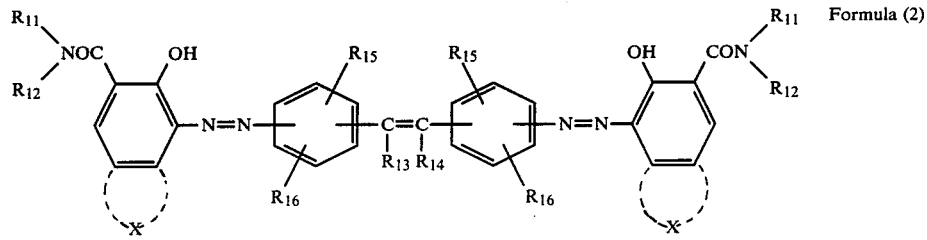

Formula (2)

$(Cp-N=N)_{\overline{3}}A_2$  Formula (3)

In these formulae;

$A_1$:

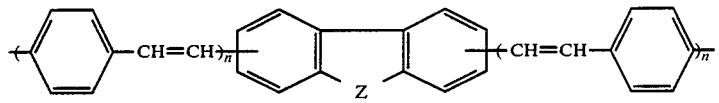

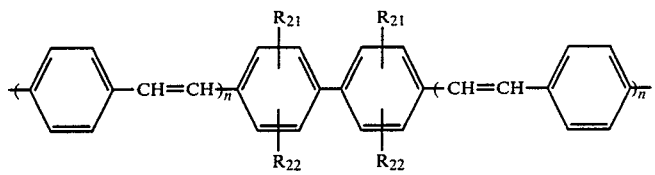

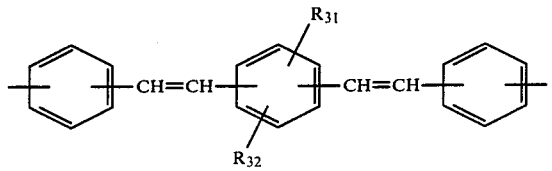

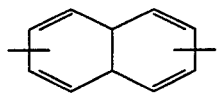

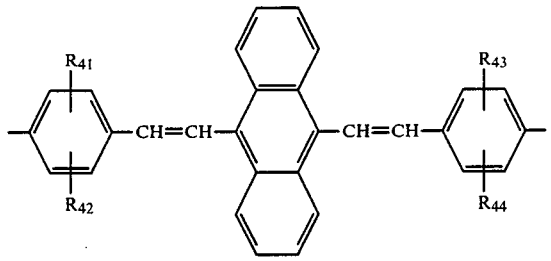

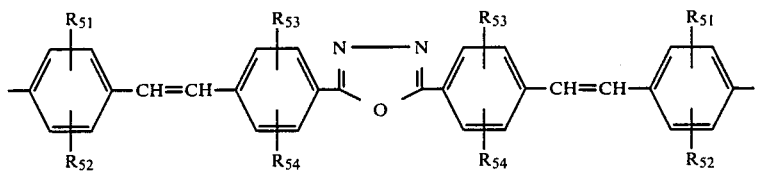

A₂:

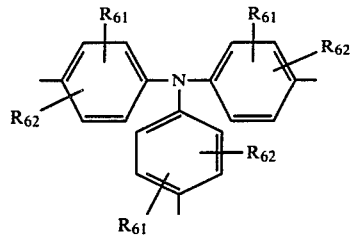

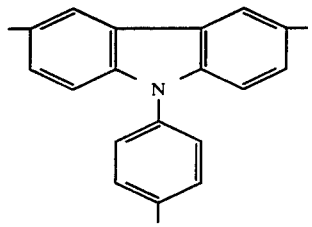

Z represents

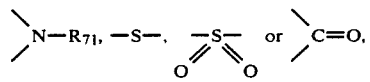

R₇₁ being hydrogen or substituted or unsubstituted alkyl, e.g. methyl, ethyl, propyl, butyl, amyl, 2-hydroxyethyl, 3-hydroxypropyl, 2-methoxyethyl, 3-methoxypropyl, 4-methoxybutyl, 2-chloroethyl, or 3-chloropropyl;
n is 0 or 1;
$R_{21}$, $R_{22}$, $R_{61}$, and $R_{62}$ represent hydrogen, alkyl (e.g. methyl, ethyl, propyl, or butyl), alkoxy (e.g. methoxy, ethoxy, propoxy, or butoxy), nitro, or hydroxyl;
$R_{31}$ and $R_{32}$ represent hydrogen or alkoxy (e.g. methoxy, ethoxy, propoxy, or butoxy); and
$R_{41}$, $R_{42}$, $R_{43}$, $R_{44}$, $R_{51}$, $R_{52}$, $R_{53}$, and $R_{54}$ represent hydrogen, halogen (e.g. chlorine, bromine, or iodine), or organic monovalent residue such as alkyl (e.g. methyl, ethyl, propyl, butyl, or amyl), alkoxy (e.g. methoxy, ethoxy, propoxy, or butoxy), acyl (e.g. acetyl, propionyl, or butyryl), nitro, hydroxyl, or cyano.

Cp:

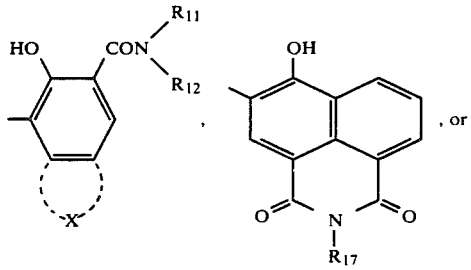

Cp:

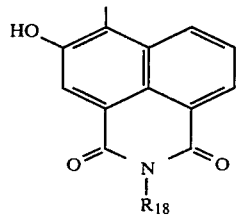

X represents a residue necessary for completing an aromatic hydrocarbon ring or a heterocyclic ring, wherein each ring may also be substituted by the following atom or group:
halogen such as chlorine, bromine, or iodine; alkyl such methyl, ethyl, propyl, butyl, or amyl; substituted alkyl such as 2-hydroxyethyl, 2-methoxyethyl, 2-ethoxyethyl, 2-chloroethyl, 3-hydroxypropyl, 3-methoxypropyl, 3-ethoxypropyl, 4-hydroxybutyl, or 4-methoxybutyl; alkoxy such as methoxy, ethoxy, propoxy, or butoxy; or acyl such as acetyl, propionyl, butyryl, benzoyl, or toluoyl. Said aromatic hydrocarbon ring includes benzene ring and naphthalene ring, and said heterocyclic ring includes indole ring, benzofuran ring, and carbazole ring.
$R_{11}$ represents hydrogen or alkyl and $R_{12}$ represents alkyl. Alkyls for $R_{11}$ or $R_{12}$ are methyl, ethyl, and $C_3$–$C_8$ linear alkyls such as n-propyl, n-butyl, n-hexyl and n-octyl, of which n-propyl and n-butyl are preferable. $R_{17}$ and $R_{18}$ represent substituted or unsubstituted alkyl such as methyl, ethyl, propyl, butyl, amyl, 2-chloroethyl, 2-methoxyethyl, 2-ethoxyethyl, 2-hydroxyethyl, 3-chloropropyl, 3-methoxypropyl, 3-ethoxypropyl, 3-hydroxypropyl, 4-methoxybutyl, 4-ethoxybutyl, or 4-hydroxybutyl; substituted or unsubstituted aralkyl such as benzyl, phenethyl, chlorobenzyl, dichlorobenzyl, trichlorobenzyl, methoxybenzyl, acetylbenzyl, α-naphthylmethyl, or β-naphthylmethyl; or substituted or unsubstituted aryl such as phenyl, tolyl, xylyl, biphenyl, chlorophenyl, dichlorophenyl, hydroxyphenyl, cyanophenyl, methoxyphenyl, dimethoxyphenyl, α-naphthyl, or β-naphthyl.

In formula (2), $R_{11}$, $R_{12}$ and X are as defined above; $R_{13}$ and $R_{14}$ represent hydrogen or cyano, and $R_{15}$ and $R_{16}$ represent hydrogen, halogen (e.g. chlorine, bromine, or iodine), alkyl (e.g. methyl, ethyl, propyl, butyl, or hexyl), alkoxy (e.g. methoxy, ethoxy, propoxy, or butoxy), nitro, or hydroxyl.

Azo pigments (disazo and trisazo) represented by formula (1), (2), or (3) are exemplified below in terms of constitutional formula.

Disazo pigments of formula (1):

| Pigment No. | Formula |
|---|---|
| (1) | $CH_3-HNOC$, OH ... N=N ... (carbazole, N-$C_2H_5$) ... N=N ... OH, $CONH-CH_3$ |
| (2) | $C_2H_5-HNOC$, OH ... N=N ... (carbazole, N-$C_2H_5$) ... N=N ... OH, $CONH-C_2H_5$ |
| (3) | $(n)C_3H_7-HNOC$, OH ... N=N ... (carbazole, N-$C_2H_5$) ... N=N ... OH, $CONH-C_3H_7(n)$ |
| (4) | $CH_3-HNOC$, OH ... N=N ... (carbazole, N-$C_2H_4OCH_3$) ... N=N ... OH, $CONH-CH_3$ |
| (5) | $CH_3-HNOC$, OH ... N=N ... (carbazole, N-$C_2H_5$) ... N=N ... OH, $CONH-CH_3$ (extended naphthyl) |
| (6) | $C_2H_5-HNOC$, OH ... N=N ... (carbazole, N-$C_2H_5$) ... N=N ... OH, $CONH-C_2H_5$ (extended naphthyl) |
| (7) | $C_3-HNOC$, OH ... N=N ... (carbazole, N-H) ... N=N ... OH, $CONH-CH_3$ |
| (8) | $C_2H_5-HNOC$, OH ... N=N ... (carbazole, N-H) ... N=N ... OH, $CONH-C_2H_5$ |

| Pigment No. | Formula |
|---|---|
| (9) | Bis-azo pigment with 9-ethylcarbazole central unit, coupled to 2-hydroxy-3-(N,N-dimethylcarbamoyl)naphthalene groups |
| (10) | Bis-azo pigment with 9-ethylcarbazole central unit, coupled to 2-hydroxy-3-(N,N-diethylcarbamoyl)naphthalene groups |
| (11) | Bis-azo pigment with carbazole (NH) central unit, coupled to hydroxy-(N-methylcarbamoyl)-benzocarbazole groups |
| (12) | Bis-azo pigment with carbazole (NH) central unit, coupled to hydroxy-(N-ethylcarbamoyl)-benzocarbazole groups |
| (13) | Bis-azo pigment with 9-ethylcarbazole central unit, coupled to hydroxy-(N-methylcarbamoyl)-benzocarbazole groups |
| (14) | Bis-azo pigment with 9-ethylcarbazole central unit, coupled to hydroxy-(N,N-dimethylcarbamoyl)-benzocarbazole groups |
| (15) | Bis-azo pigment with carbazole (NH) central unit, coupled to hydroxy-(N-methylcarbamoyl)-dibenzofuran groups |
| (16) | Bis-azo pigment with 9-(2-chloroethyl)carbazole central unit, coupled to hydroxy-(N-methylcarbamoyl)-dibenzofuran groups |

-continued

| Pigment No. | Formula |
|---|---|

(17) through (24): chemical structure diagrams.

| Pigment No. | Formula |
|---|---|
| (25) | Bis-azo pigment with carbazole (N-C₂H₅) core linked via CH=CH-phenyl-N=N to naphthol units bearing OH and CON(CH₃)₂ groups |
| (26) | Bis-azo pigment with carbazole (N-C₂H₅) core linked via CH=CH-phenyl-N=N to naphthol units bearing OH and CONH-C₂H₅ groups |
| (27) | Bis-azo pigment with carbazole (N-C₂H₄OCH₃) core linked via CH=CH-phenyl-N=N to naphthol units bearing OH and CONH-CH₃ groups |
| (28) | Bis-azo pigment with carbazole (N-C₂H₅) core, coupled to carbazole-fused naphthol units (N-C₂H₅) with OH and CONH-CH₃ |
| (29) | Bis-azo pigment with carbazole (N-C₂H₅) core, coupled to NH-containing fused heterocyclic naphthol units with OH and CONH-CH₃ |
| (30) | Bis-azo pigment with carbazole (N-C₂H₅) core, coupled to benzofuran-fused naphthol units with OH and CONH-CH₃ |
| (31) | Bis-azo pigment with carbazole (N-C₂H₅) core linked via CH=CH-phenyl-N=N to naphthalimide (N-CH₃) units bearing OH |
| (32) | Bis-azo pigment with carbazole (N-C₂H₄OH) core linked via CH=CH-phenyl-N=N to naphthalimide (N-C₂H₄OH) units bearing OH |

-continued
| Pigment No. | Formula |
|---|---|
| (33) | 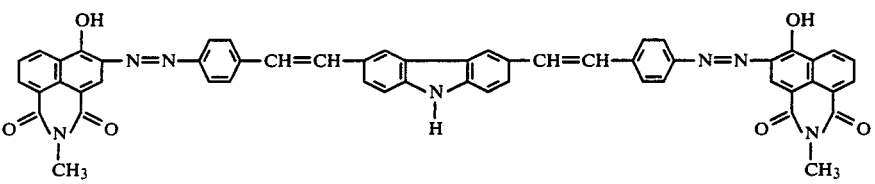 |
| (34) | 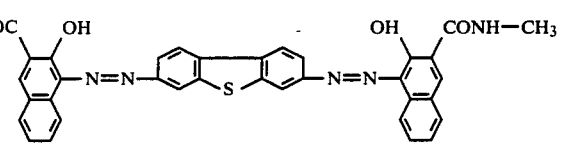 |
| (35) | 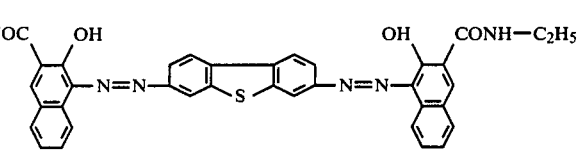 |
| (36) | 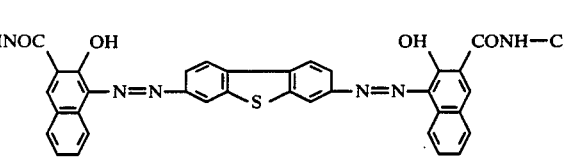 |
| (37) | 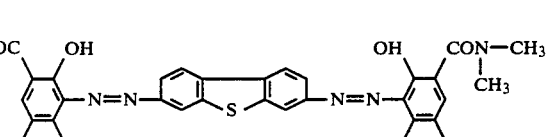 |
| (38) | 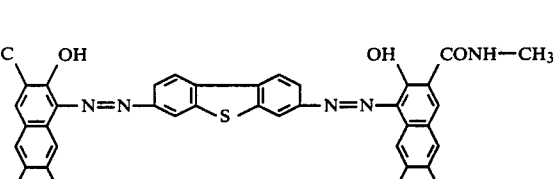 |
| (39) | 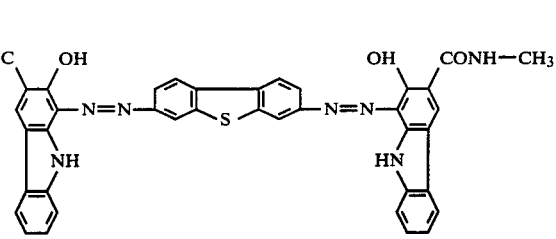 |
| (40) | 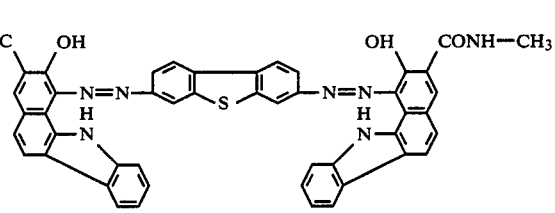 |

-continued
| Pigment No. | Formula |
|---|---|
| (41) | 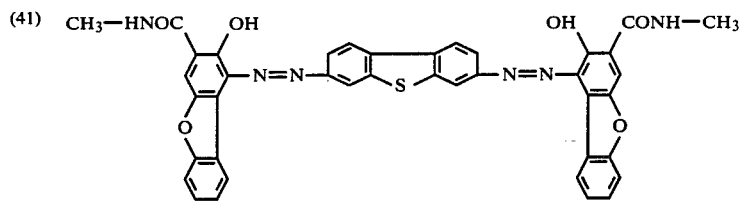 |
| (42) | 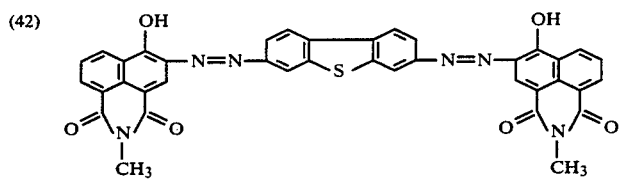 |
| (43) | 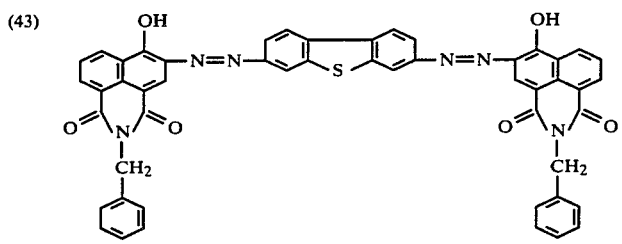 |
| (44) | 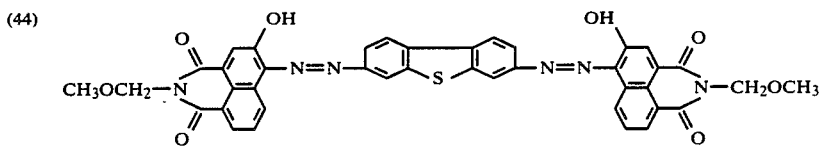 |
| (45) | 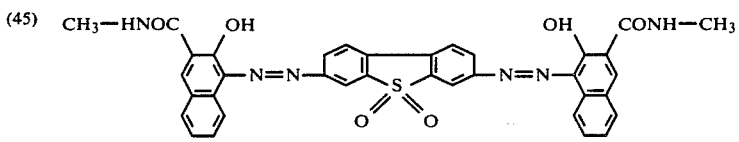 |
| (46) | 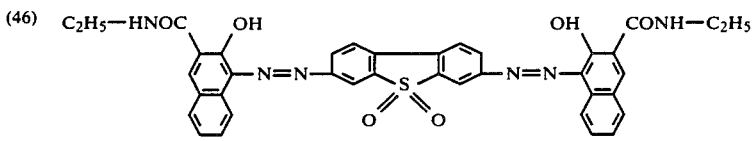 |
| (47) | 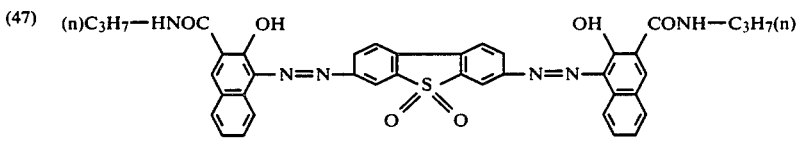 |
| (48) | 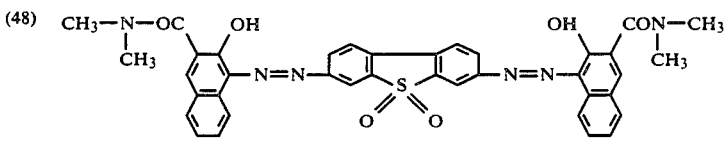 |

-continued
| Pigment No. | Formula |
|---|---|
| (49) | 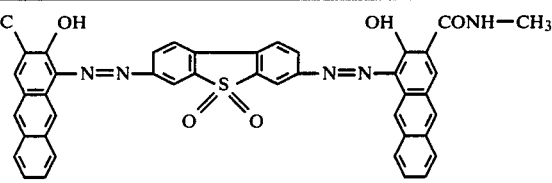 |
| (50) | 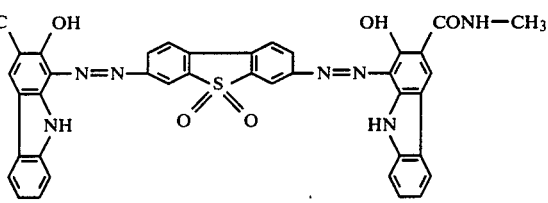 |
| (51) | 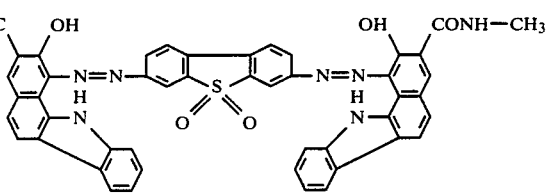 |
| (52) | 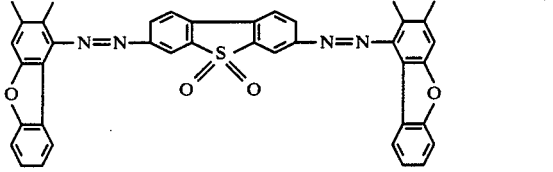 |
| (53) | 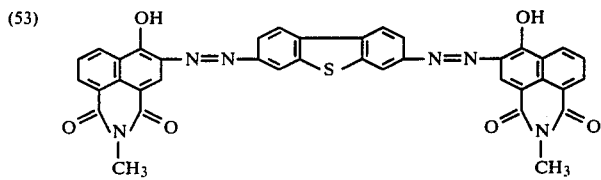 |
| (54) | 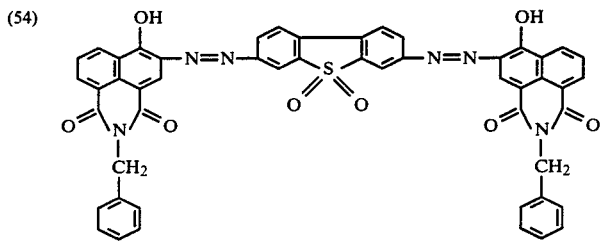 |
| (55) | 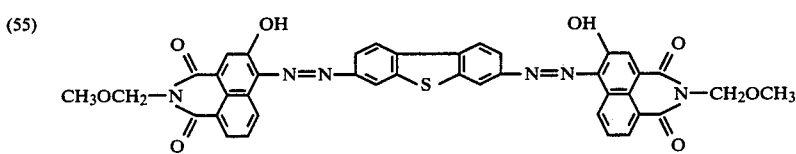 |
| (56) | 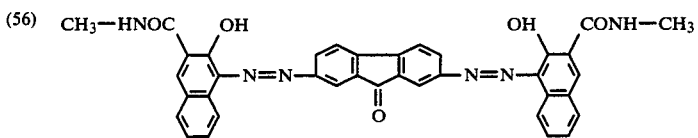 |

-continued
| Pigment No. | Formula |
|---|---|
| (57) | 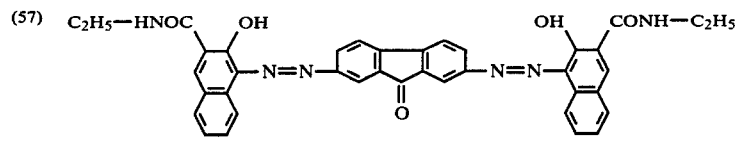 |
| (58) | 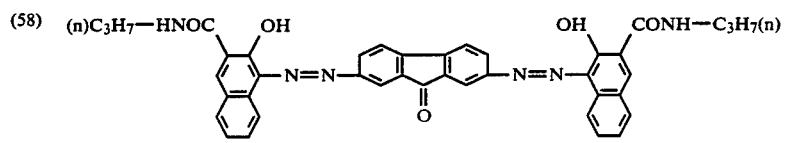 |
| (59) | 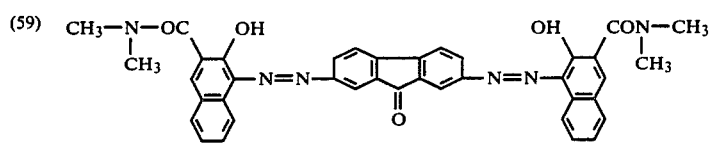 |
| (60) | 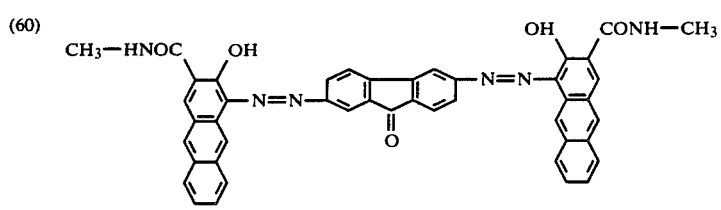 |
| (61) | 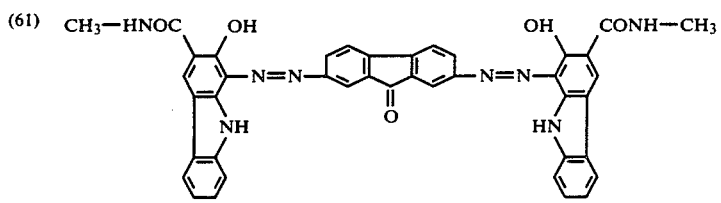 |
| (62) | 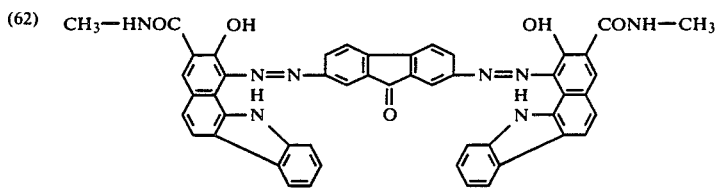 |
| (63) | 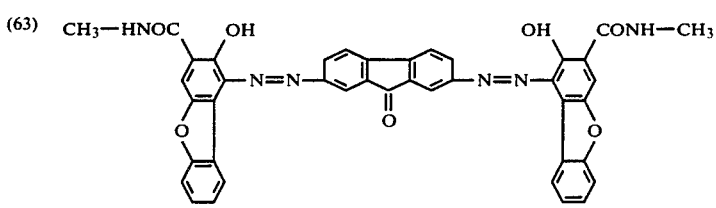 |
| (64) | 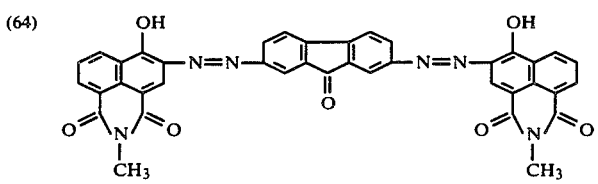 |

| Pigment No. | Formula |
|---|---|
| (65) | Structure: bis(1-hydroxy-N-phenyl-naphthalimide) linked via azo groups to 9-fluorenone |
| (66) | Structure: bis(1-hydroxy-N-methoxymethyl-naphthalimide) linked via azo groups to 9-fluorenone |
| (67) | $CH_3$—HNOC / OH ... biphenyl bis-azo naphthol bis(N-methylcarboxamide) |
| (68) | $CH_3$—HNOC / OH ... 3,3'-dimethylbiphenyl bis-azo naphthol bis(N-methylcarboxamide) |
| (69) | $CH_3$—HNOC / OH ... 3,3'-dimethoxybiphenyl bis-azo naphthol bis(N-methylcarboxamide) |
| (70) | $CH_3$—HNOC / OH ... 3,3'-dihydroxybiphenyl bis-azo naphthol bis(N-methylcarboxamide) |
| (71) | $C_2H_5$—HNOC / OH ... 3,3'-dimethoxybiphenyl bis-azo naphthol bis(N-ethylcarboxamide) |
| (72) | (n)$C_3H_7$—HNOC / OH ... 3,3'-dimethoxybiphenyl bis-azo naphthol bis(N-n-propylcarboxamide) |
| (73) | $CH_3$—N(—$CH_3$)—OC / OH ... 3,3'-dimethoxybiphenyl bis-azo naphthol bis(N,N-dimethylcarboxamide) |

-continued
| Pigment No. | Formula |
|---|---|
| (74) | 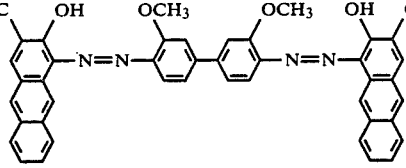 |
| (75) | 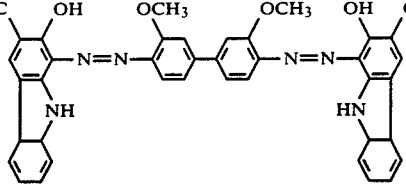 |
| (76) | 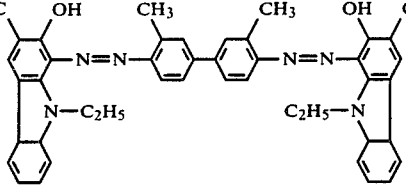 |
| (77) | 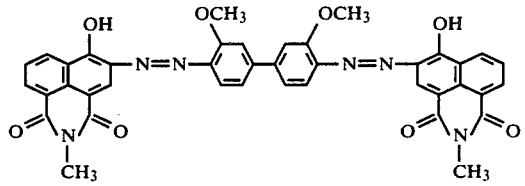 |
| (78) | 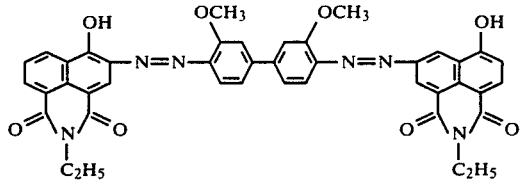 |
| (79) | |
| (80) | 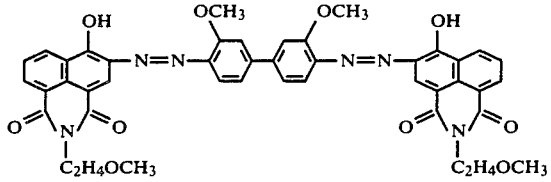 |

-continued

| Pigment No. | Formula |
|---|---|
| (81) | *structure* |
| (82) | *structure* |
| (83) | *structure* |
| (84) | *structure* |
| (85) | *structure* |
| (86) | *structure* |
| (87) | *structure* |
| (88) | *structure* |

-continued

| Pigment No. | Formula |
|---|---|
| (89) | |
| (90) | |
| (91) | |
| (92) | |
| (93) | |
| (94) | |
| (95) | |
| (96) | |

-continued
| Pigment No. | Formula |
|---|---|
| (97) | CH₃—HNOC, OH, NO₂, OH, CONH—CH₃ 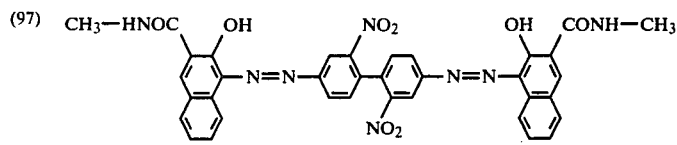 |
| (98) | C₂H₅—HNOC, OH, NO₂, OH, CONH—C₂H₅ 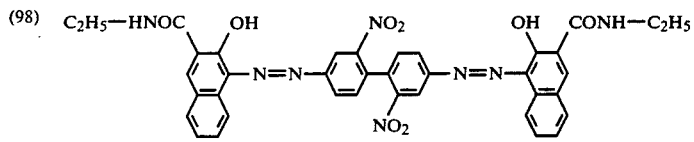 |
| (99) | (n)C₄H₉—HNOC, OH, NO₂, OH, CONH—C₄H₉(n) 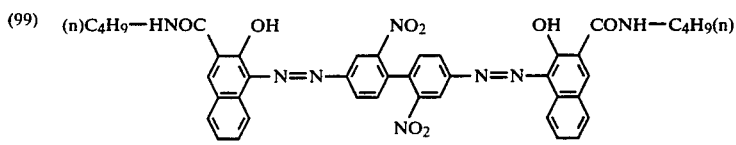 |
| (100) | CH₃—N—OC, OH, NO₂, OH, CON—CH₃; CH₃, CH₃ 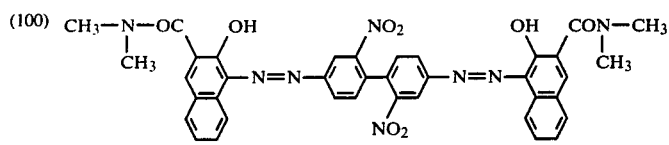 |
| (101) | CH₃—HNOC, OH, NO₂, OH, CONH—CH₃ 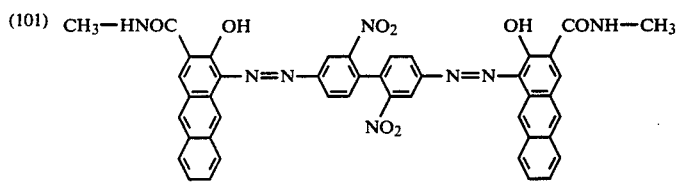 |
| (102) | CH₃—HNOC, OH, NO₂, OH, CONH—CH₃; NH, NO₂, HN 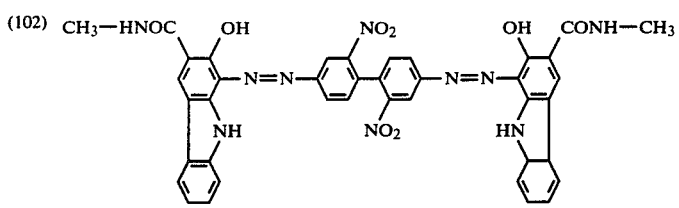 |
| (103) | CH₃—HNOC, OH, NO₂, OH, CONH—CH₃; O, NO₂, O 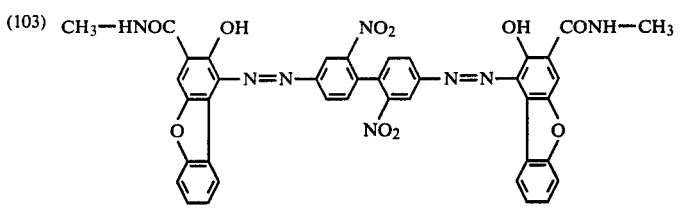 |
| (104) | CH₃—HNOC, OH, NO₂, OH, CONH—CH₃; H, N, NO₂, H, N 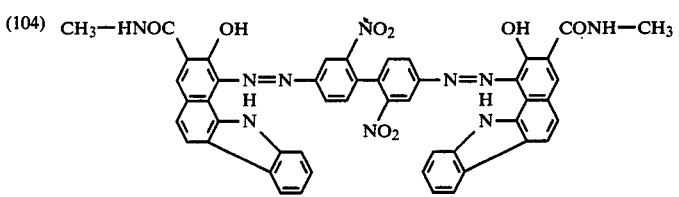 |

-continued
| Pigment No. | Formula |
|---|---|
| (105) | 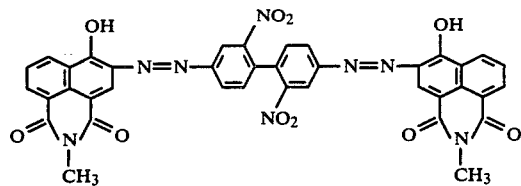 |
| (106) | 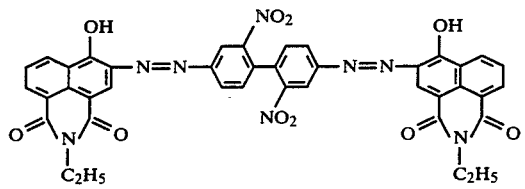 |
| (107) | 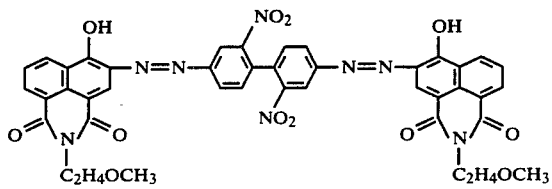 |
| (108) | 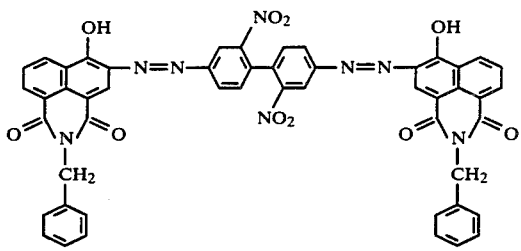 |
| (109) | 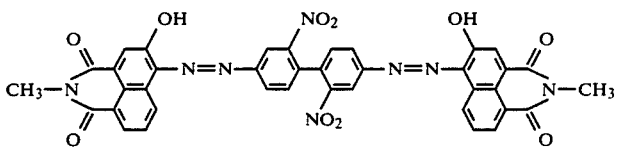 |
| (110) | 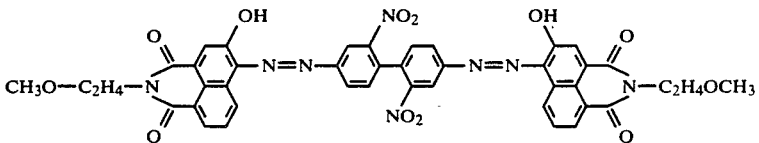 |
| (111) | 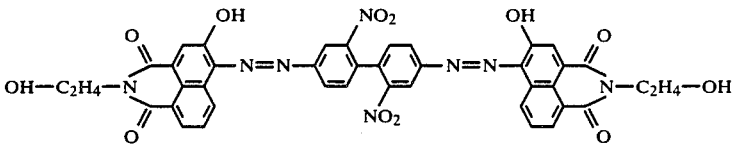 |
| (112) | 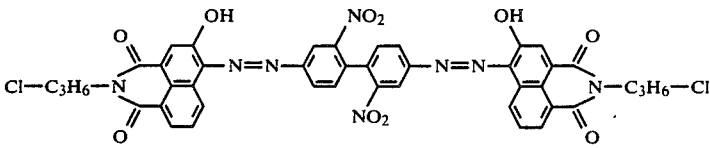 |

| Pigment No. | Formula |
|---|---|
| (113) | Chemical structure diagram |
| (114) | Chemical structure diagram |
| (115) | Chemical structure diagram |
| (116) | Chemical structure diagram |
| (117) | Chemical structure diagram |
| (118) | Chemical structure diagram |
| (119) | Chemical structure diagram |
| (120) | Chemical structure diagram |
| (121) | Chemical structure diagram |

-continued
| Pigment No. | Formula |
|---|---|
| (122) | 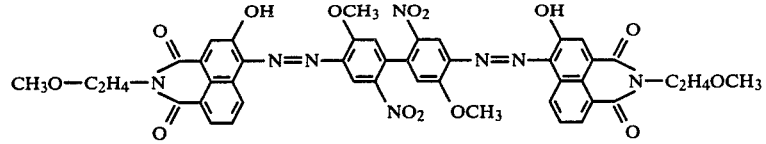 |
| (123) | 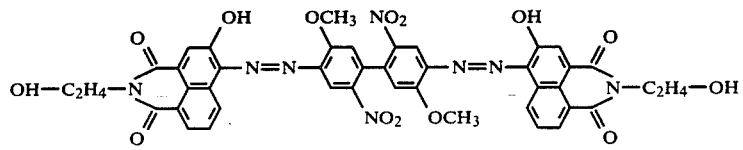 |
| (124) | 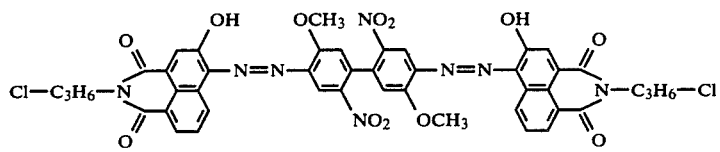 |
| (125) | 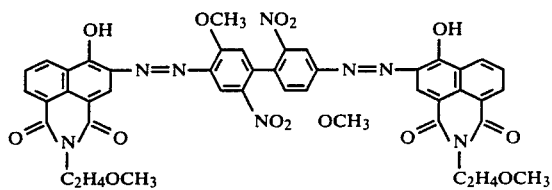 |
| (126) | 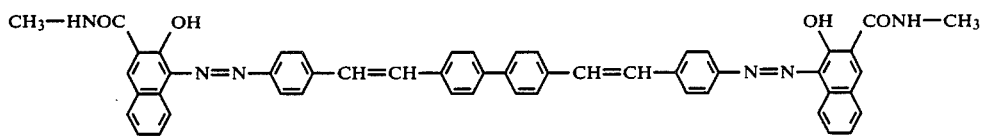 |
| (127) | 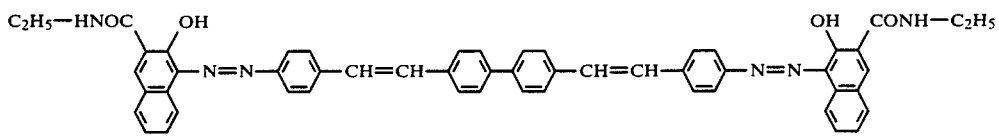 |
| (128) | 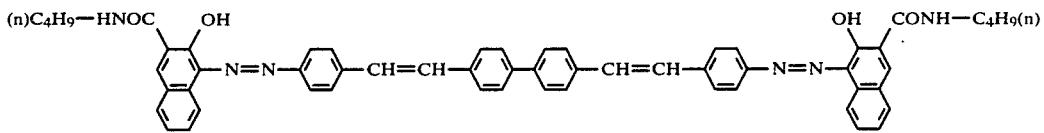 |
| (129) | 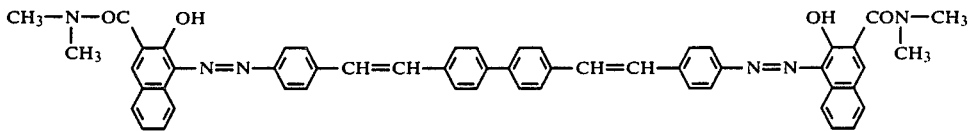 |
| (130) | 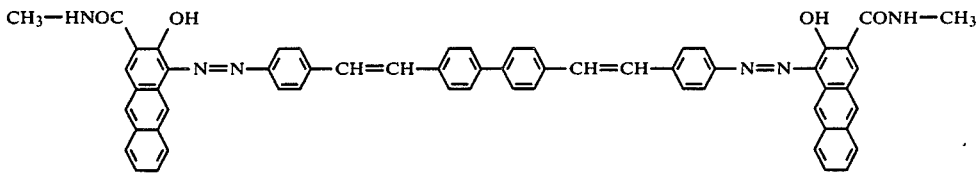 |

-continued
| Pigment No. | Formula |
|---|---|
| (131) | 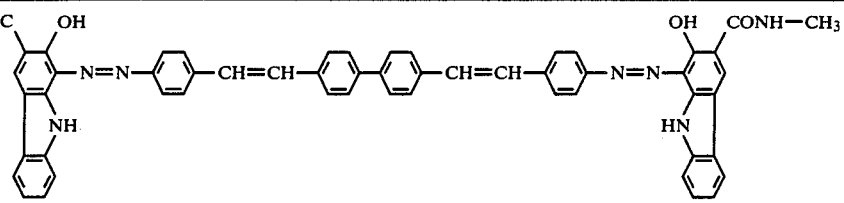 |
| Pigment No. | Formula |
|---|---|
| (132) | 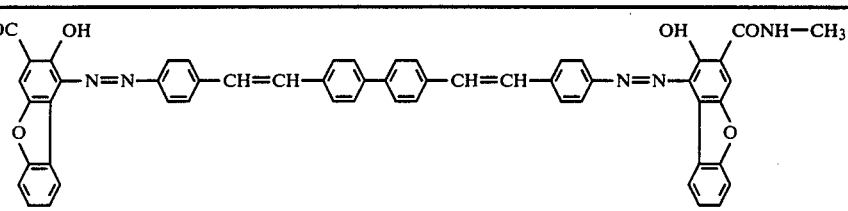 |
| (133) | 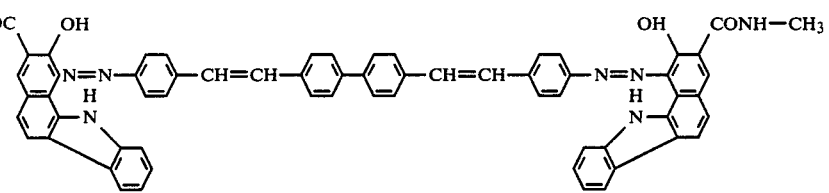 |
| (134) | 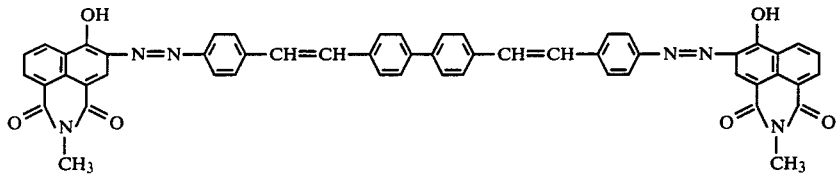 |
| (135) | 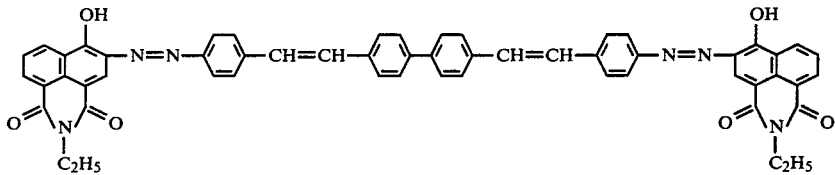 |
| (136) | 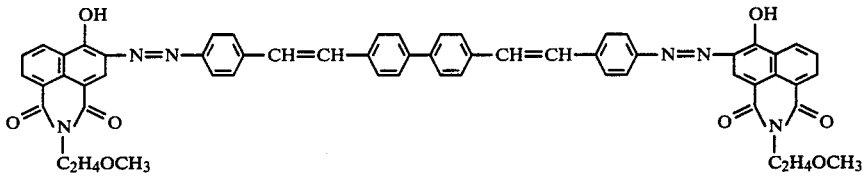 |
| (137) | 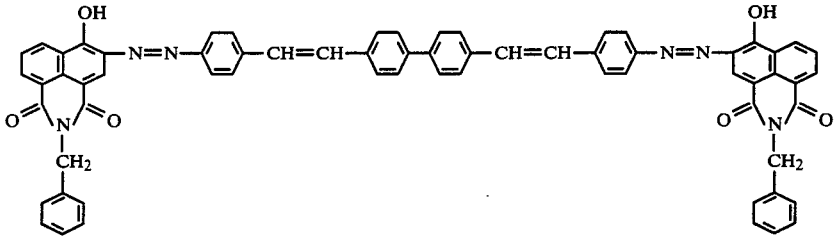 |

| Pigment No. | Formula |
|---|---|
| (138) | 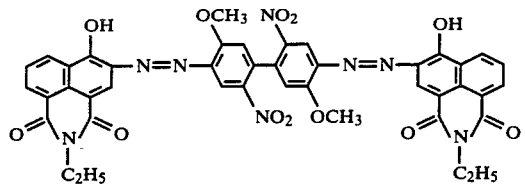 |
| (139) | 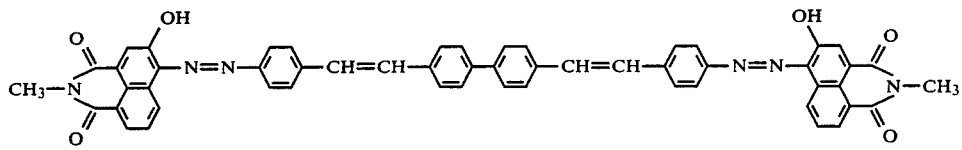 |
| (140) | 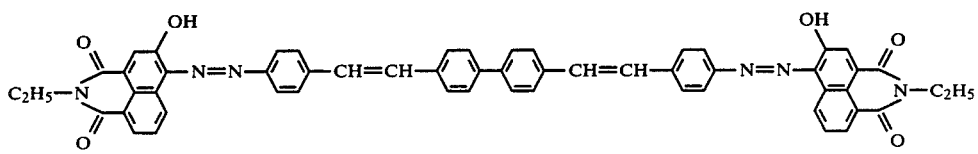 |
| (141) | 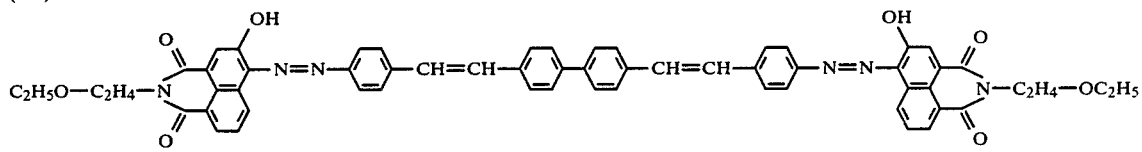 |
| (142) | 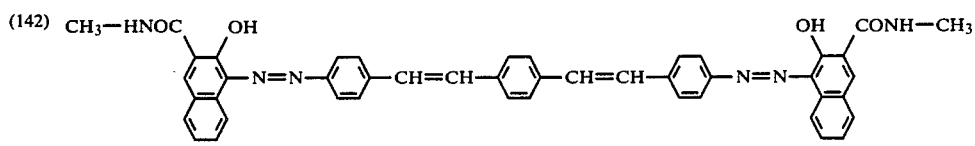 |
| (143) | 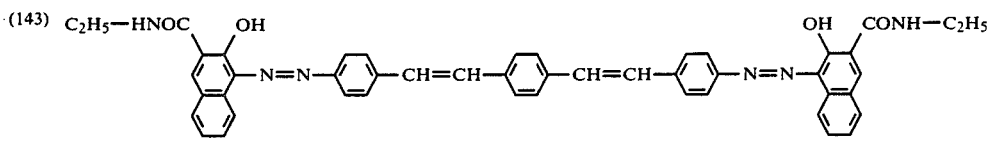 |
| (144) | 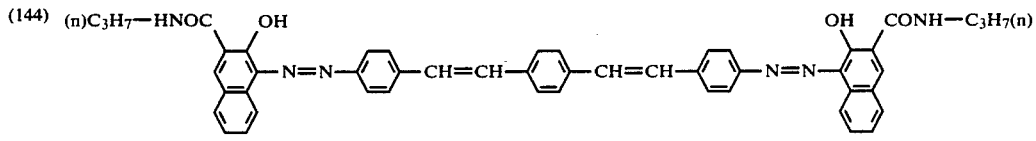 |
| (145) | 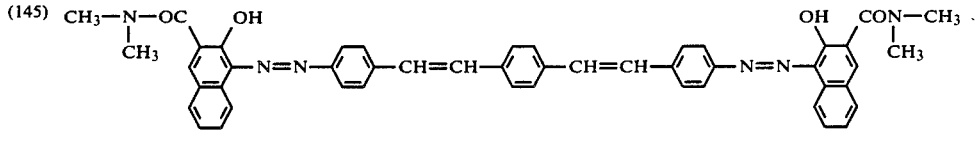 |
| (146) | 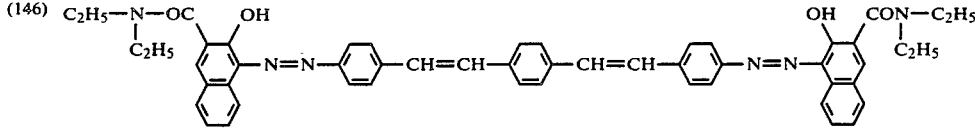 |

-continued
| Pigment No. | Formula |
|---|---|
| (147) |  |
| (148) |  |
| (149) |  |
| (150) |  |
| (151) |  |
| (152) |  |
| (153) |  |

-continued

| Pigment No. | Formula |
|---|---|
| (154) | (structure: bis-naphthalimide azo stilbene derivative with N-CH₂-phenyl groups) |
| (155) | (structure: bis-naphthalimide azo stilbene derivative with N-CH₃ groups) |
| (156) | (structure: bis-naphthalimide azo stilbene derivative with N-C₂H₄OH groups) |
| (157) | CH₃—HNOC ... OCH₃ ... CONH—CH₃ (bis-naphthol azo-stilbene with dimethoxy center) |
| (158) | C₂H₅—HNOC ... OCH₃ ... CONH—C₂H₅ |
| (159) | (n)C₃H₇—HNOC ... OCH₃ ... CONH—C₃H₇(n) |
| (160) | (CH₃)₂N—OC ... OCH₃ ... CON(CH₃)₂ |
| (161) | (C₂H₅)₂N—OC ... OCH₃ ... CON(C₂H₅)₂ |
| (162) | CH₃—HNOC ... OCH₃ ... CONH—CH₃ (anthracene-based) |

| Pigment No. | Formula |
|---|---|
| (163) | 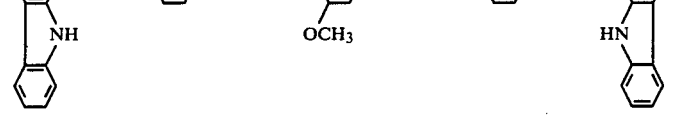 |
| (164) | 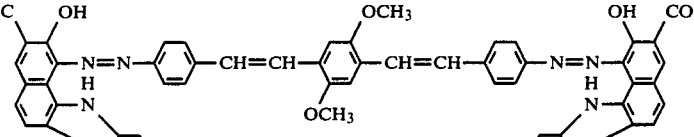 |
| (165) | 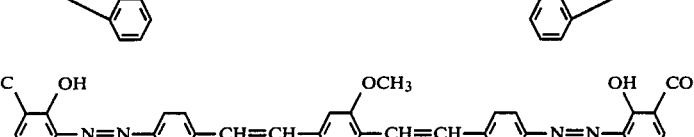 |
| (166) | 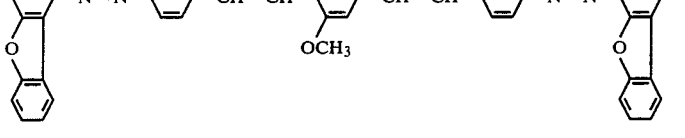 |
| (167) | 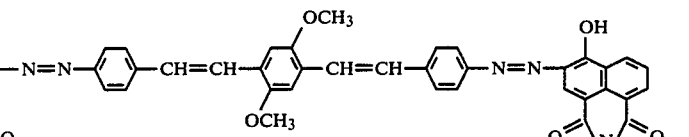 |
| (168) | 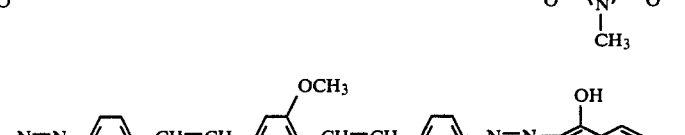 |
| (169) | 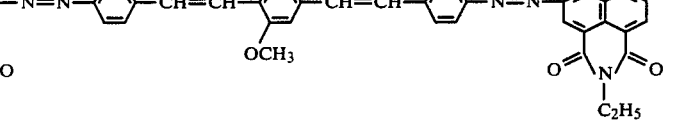 |
| (170) | 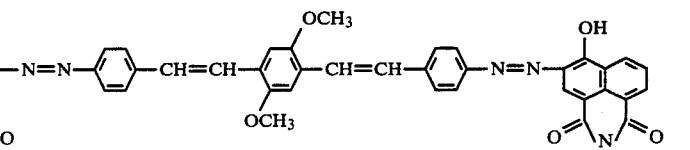 |

-continued
| Pigment No. | Formula |
|---|---|
| (171) | 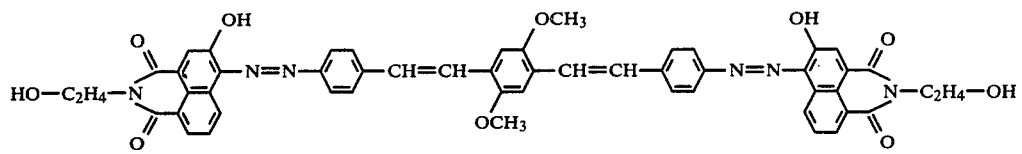 |
| (172) | 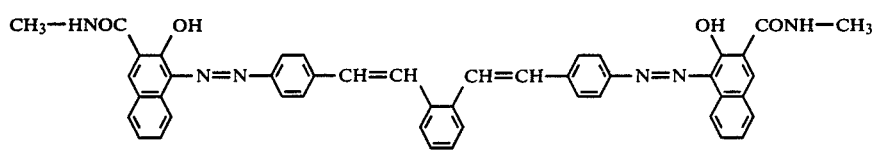 |
| (173) | 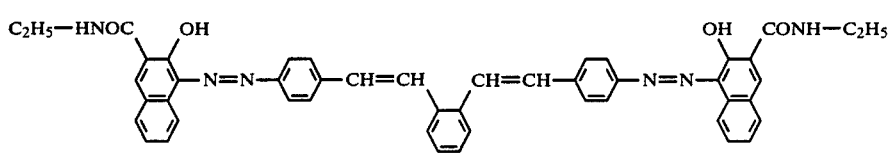 |
| (174) | 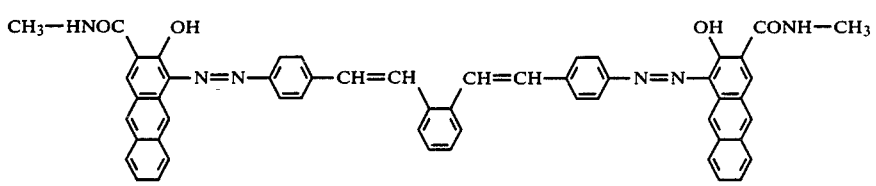 |
| (175) | 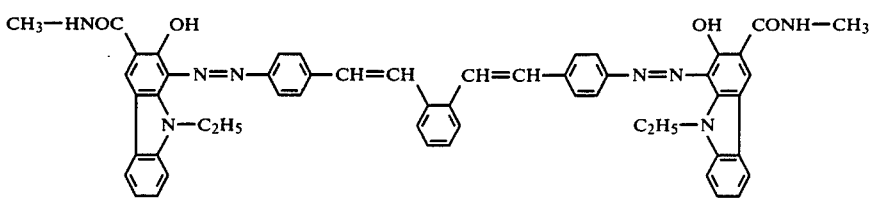 |
| (176) | 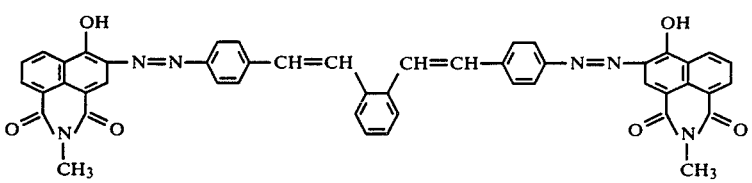 |
| (177) | 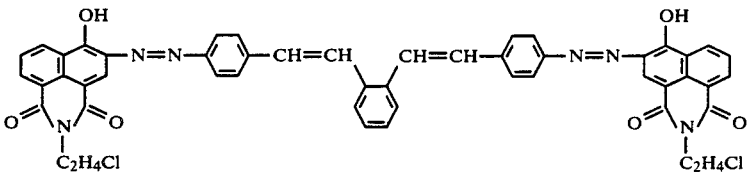 |
| (178) | 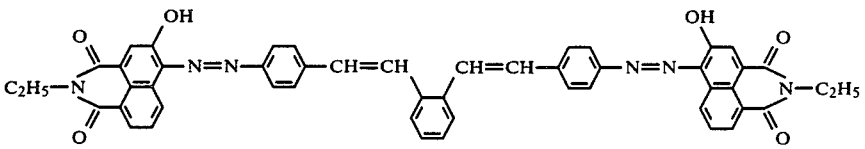 |

-continued
| Pigment No. | Formula |
|---|---|
| (179) | 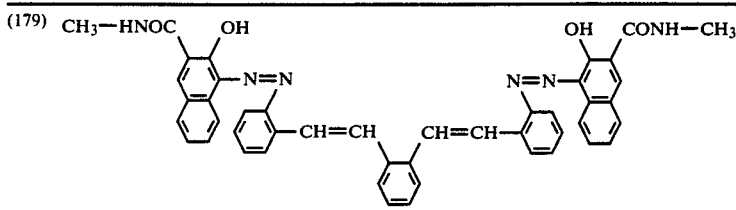 |
| (180) | 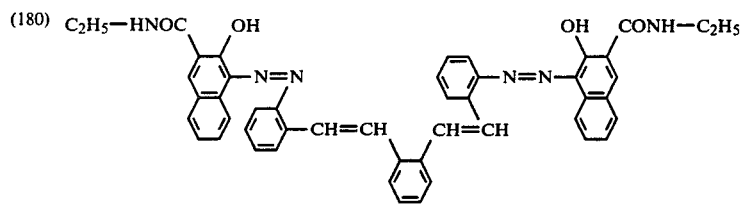 |
| (181) | 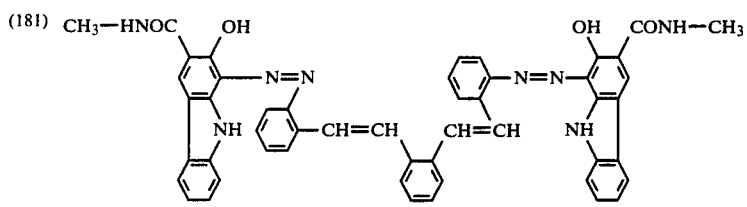 |
| (182) | 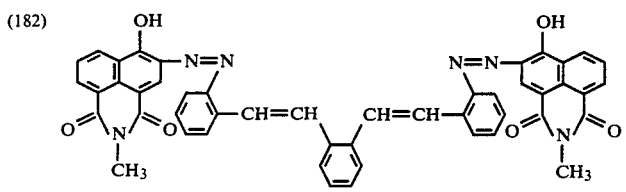 |
| (183) | 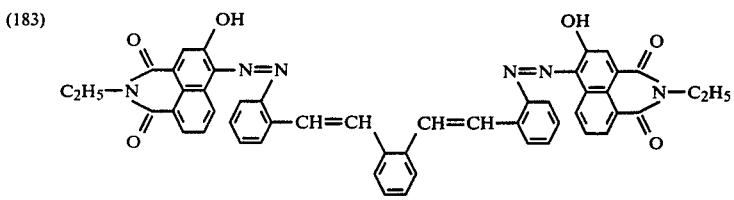 |
| Pigment No. | Formula | Pigment No. | Formula | Pigment No. | Formula |
|---|---|---|---|---|---|
| | N=N—Cp<br>Cp—N=N<br>Cp | (184) | OH  CONH—CH$_3$ | (185) | OH  CONH—C$_2$H$_5$ |
| (186) | OH  CONH—C$_3$H$_7$(n) | (187) | OH  CONH—C$_4$H$_9$(n) | (188) | OH  CON(CH$_3$)$_2$ |

-continued
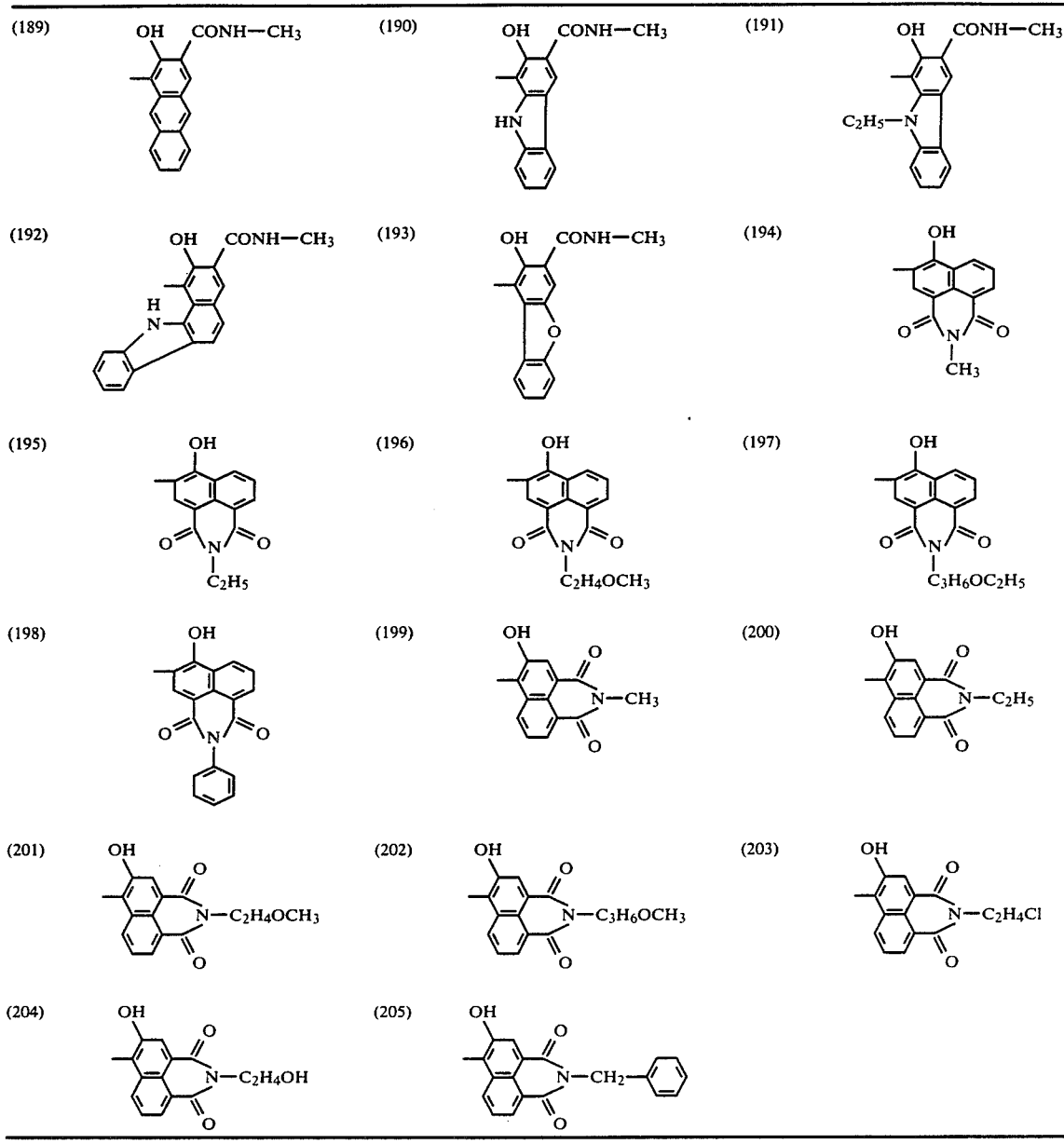
| Pigment No. | Formula |
|---|---|
(206) 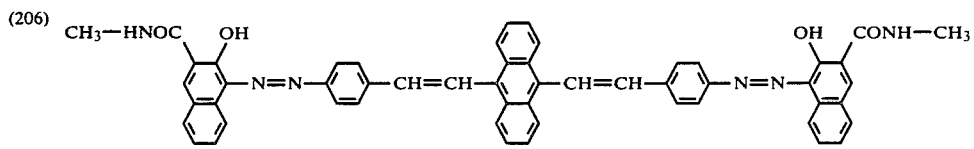
(207) 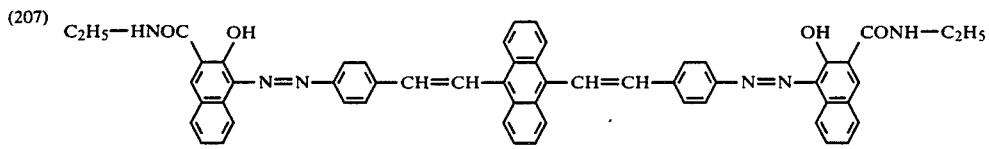

-continued
(208) 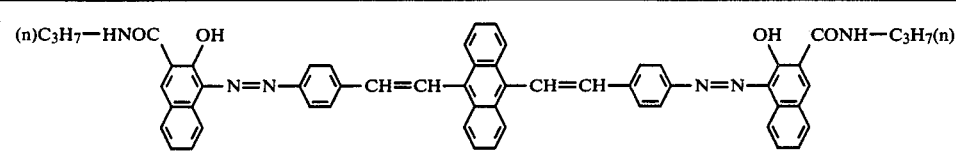
(209) 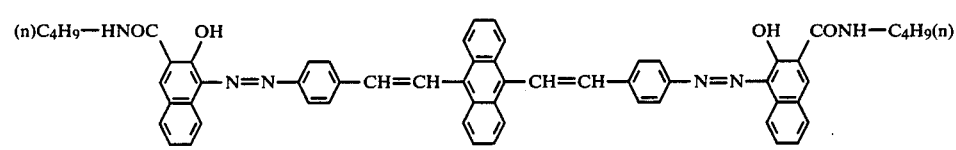
(210) 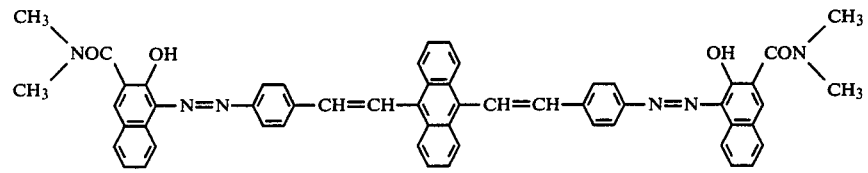
(211) 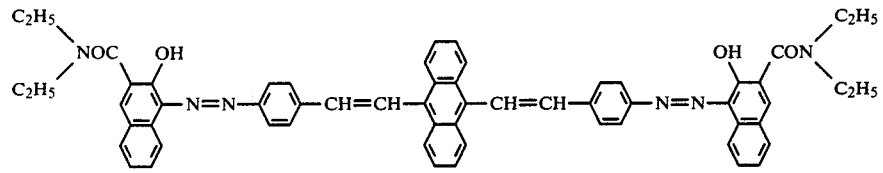
(212) 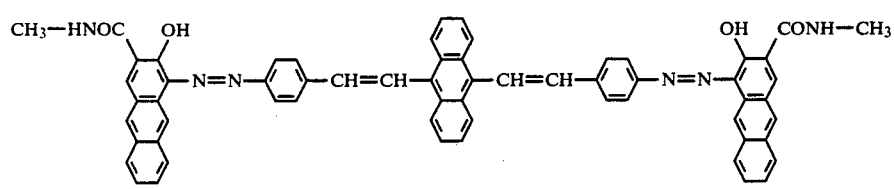
(213) 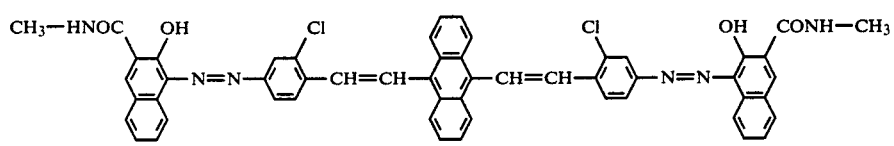
(214) 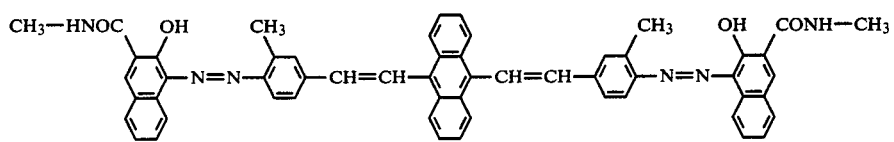
(215) 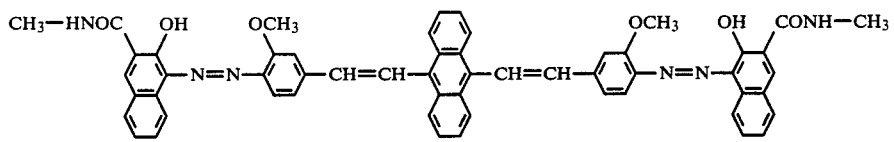
(216) 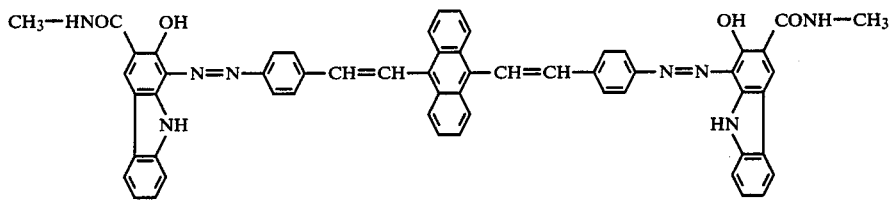

(217) 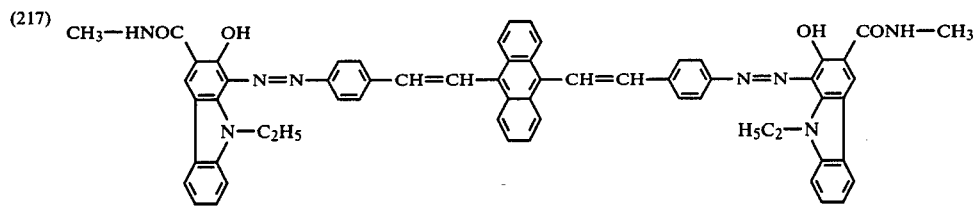
(218) 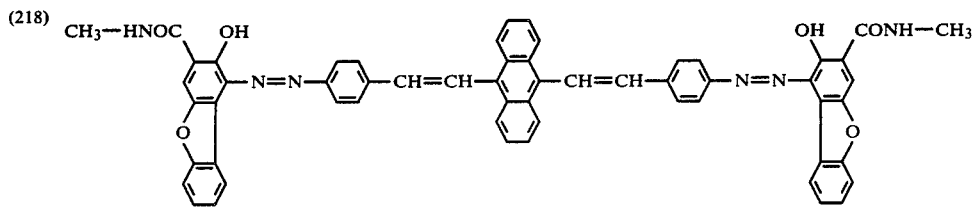
(219) 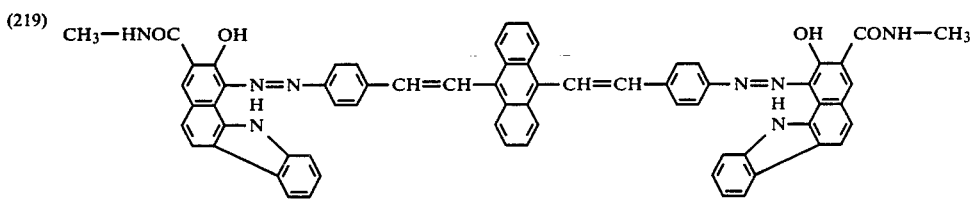
(220) 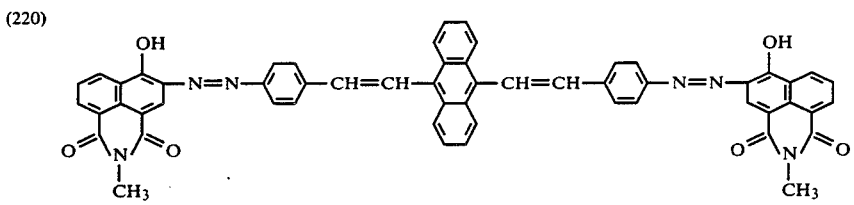
(221) 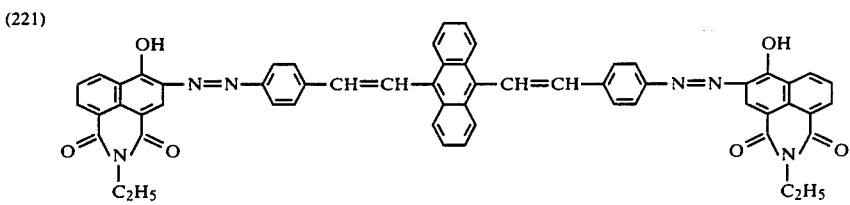
(222) 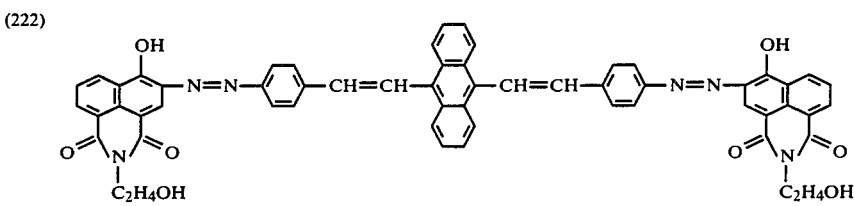
(223) 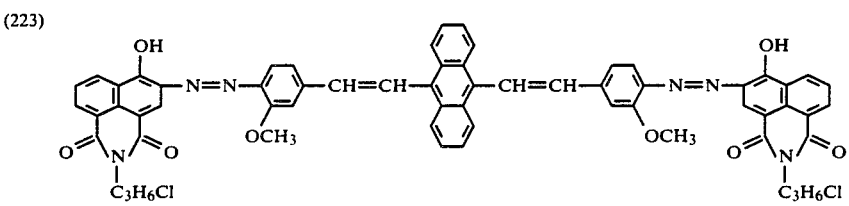

-continued
(224)
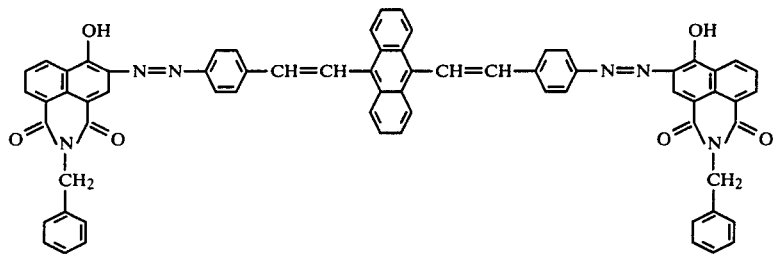
(225)
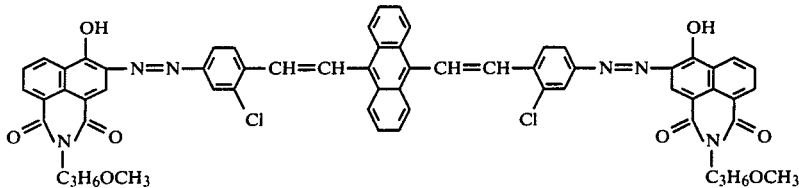
(226)
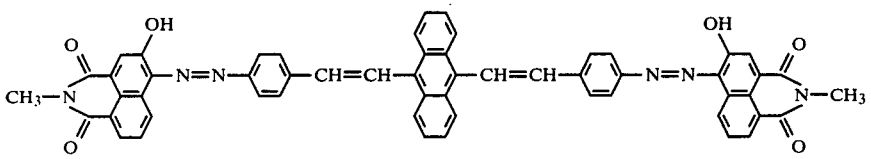
(227)
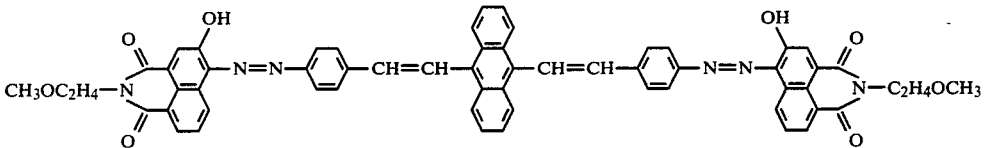
(228)
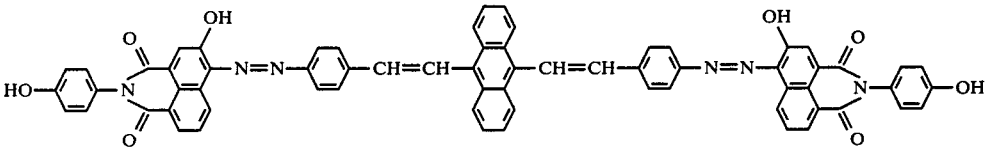
(229)
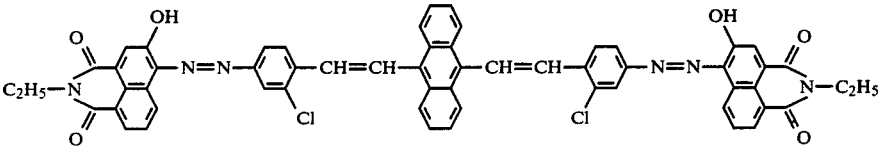
(230)
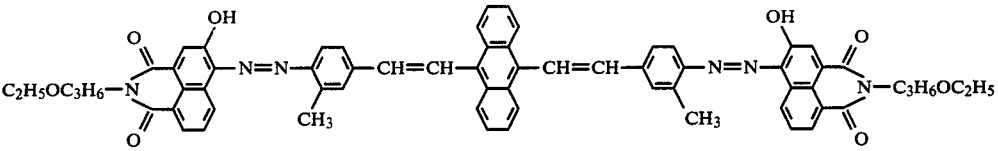
(231)
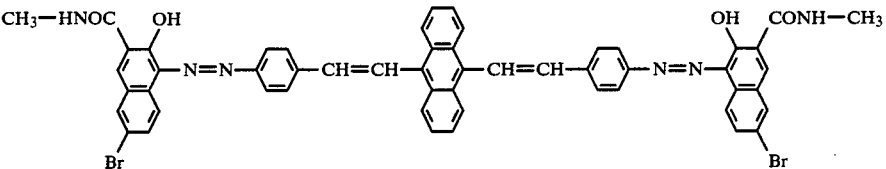

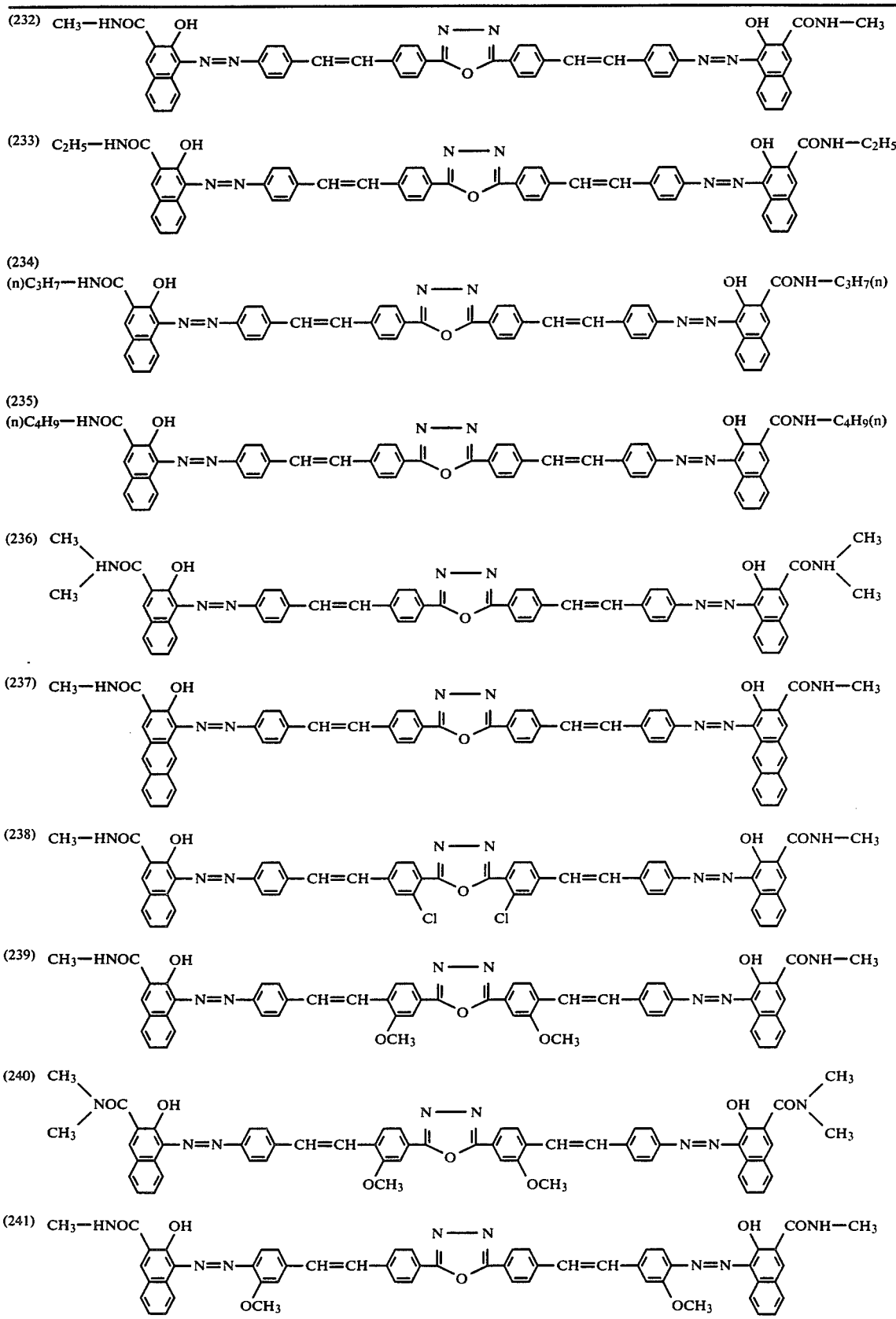

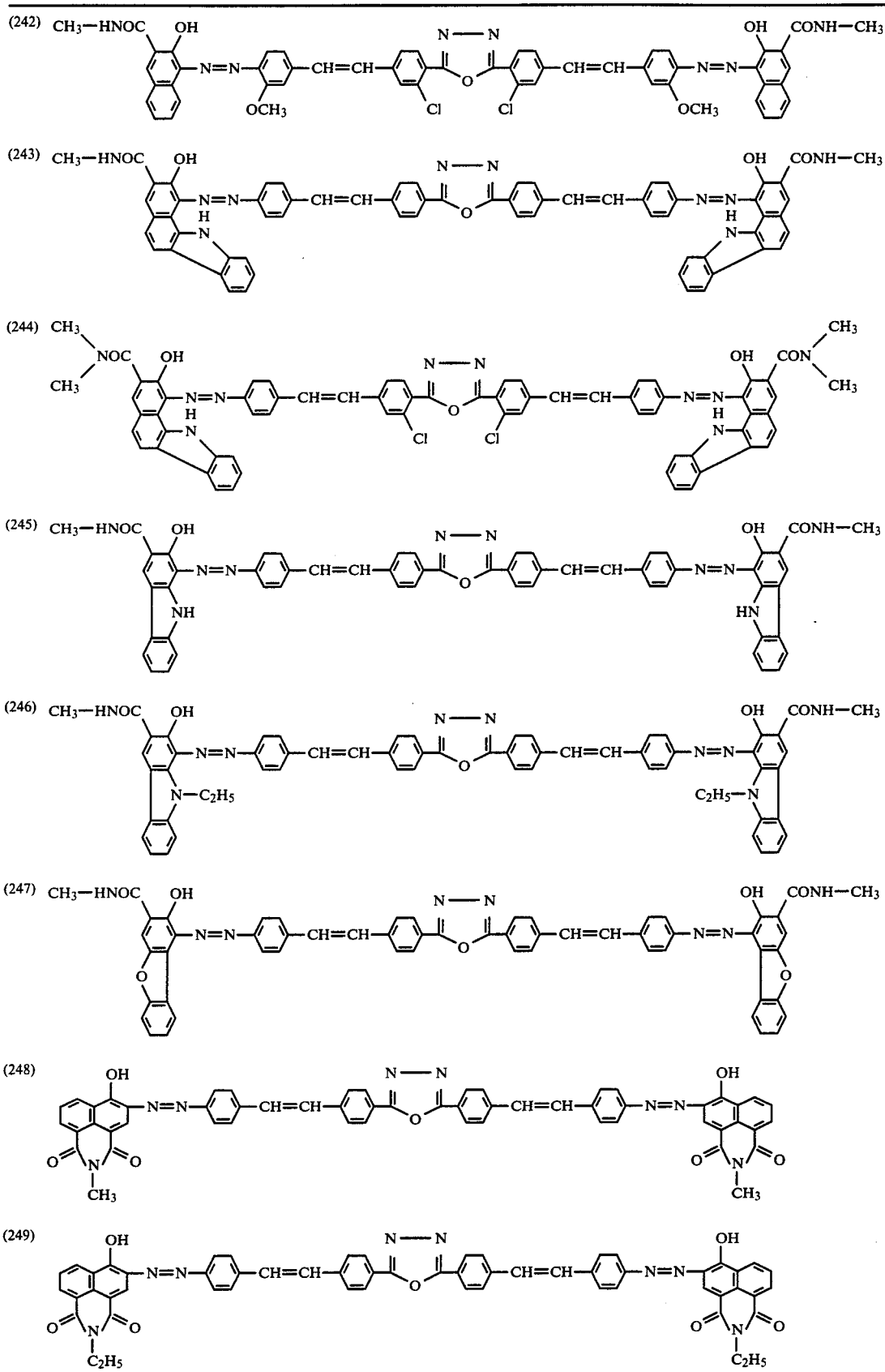

(250) 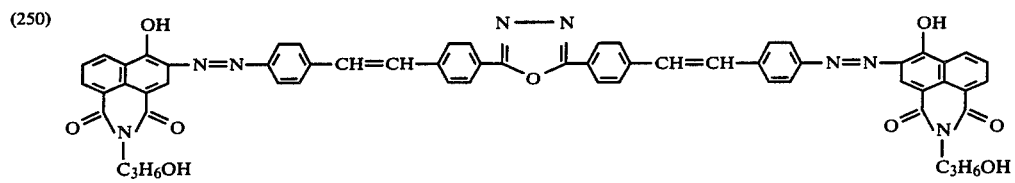
(251) 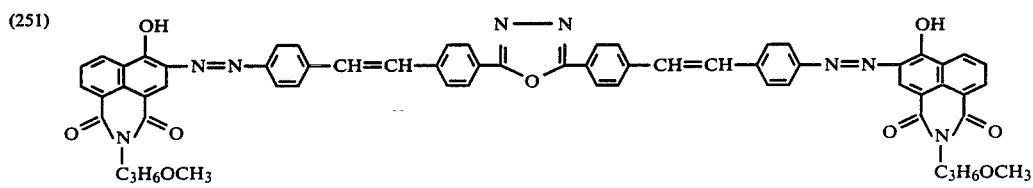
(252) 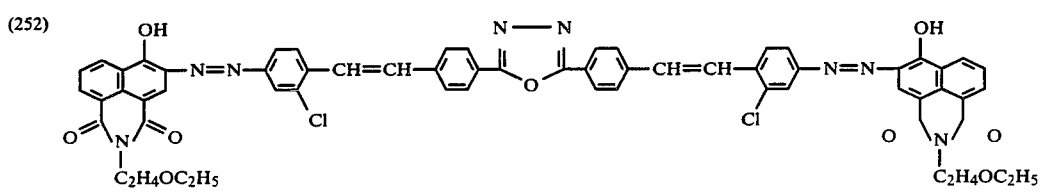
(253) 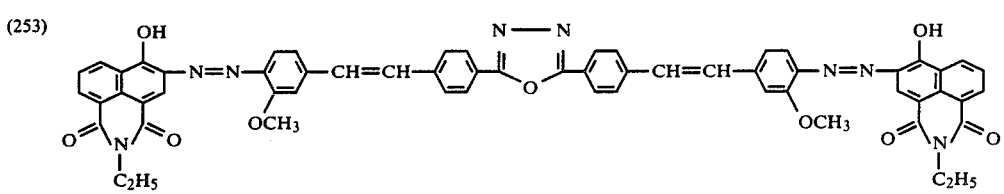
(254) 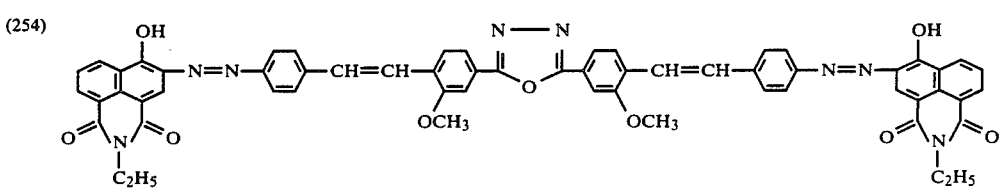
(255) 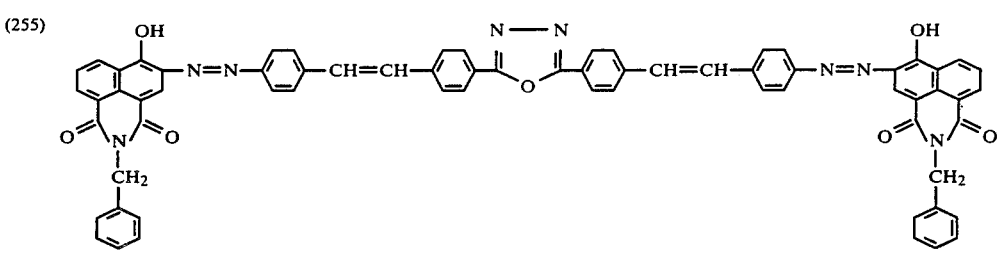
(256) 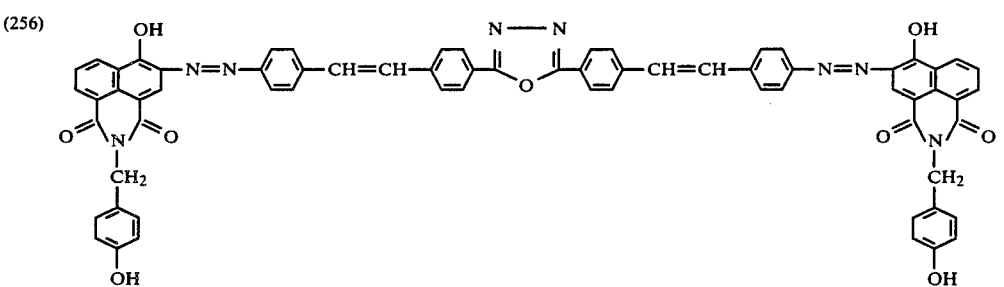

-continued
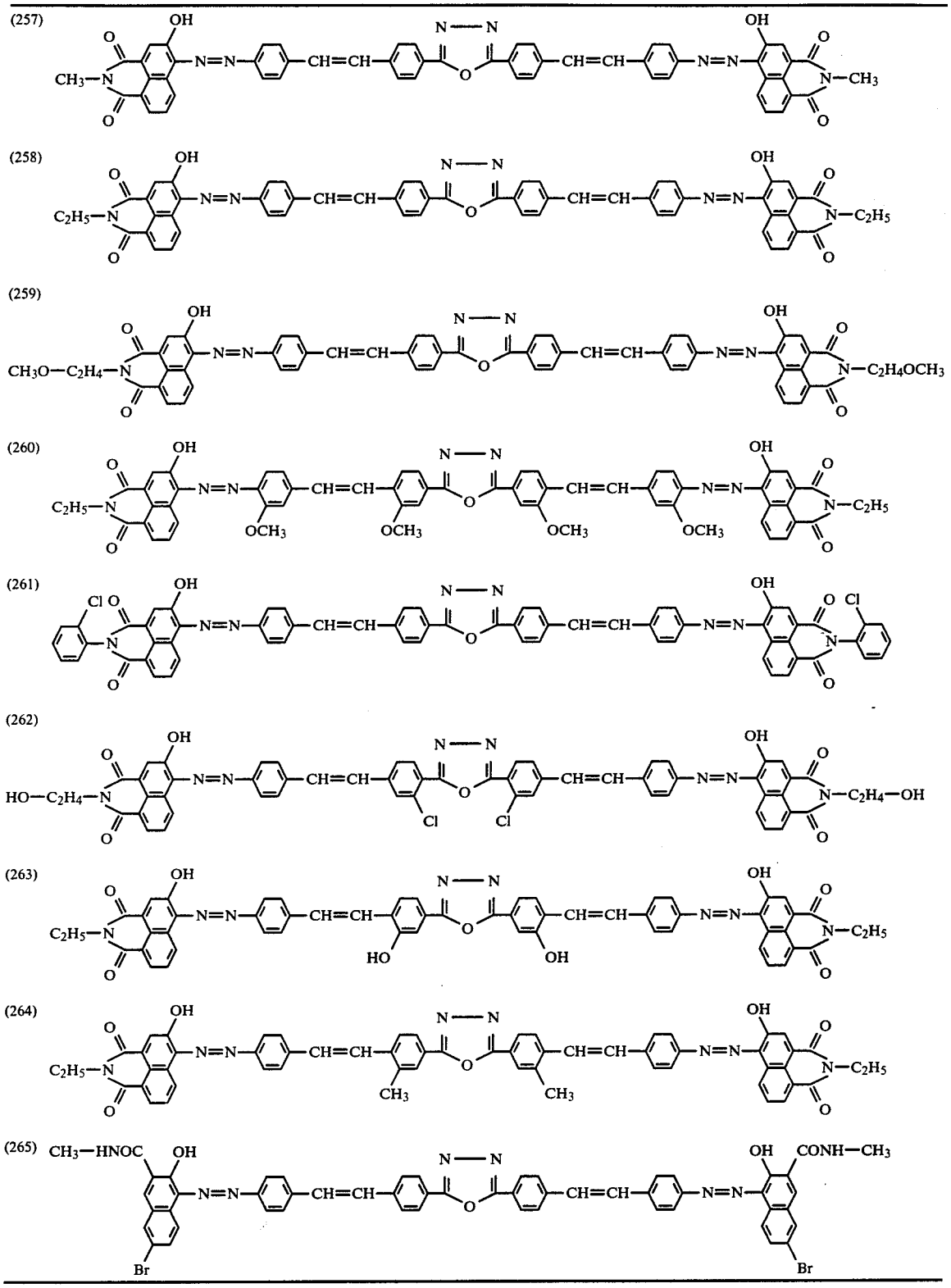
Disazo pigments of formula (2):

| Pigment No. | Formula |
|---|---|
| (266) | 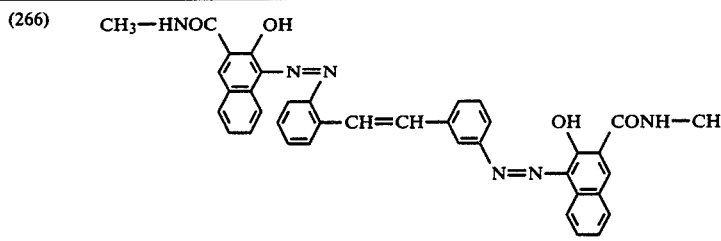 |
| (267) | 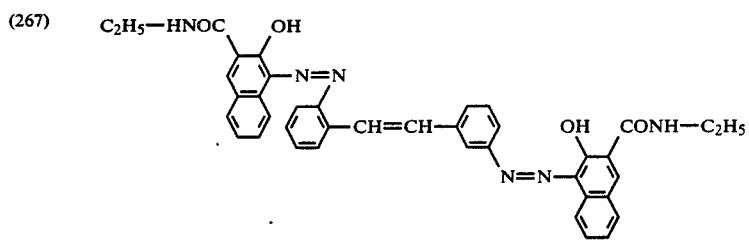 |
| (268) | 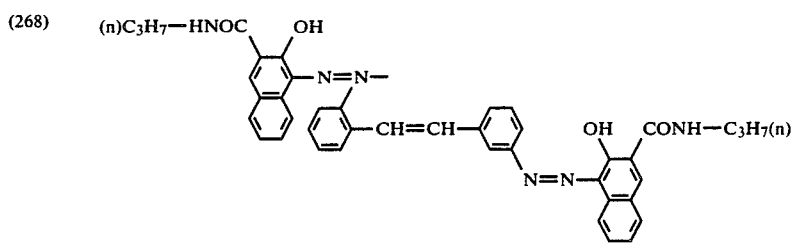 |
| (269) | 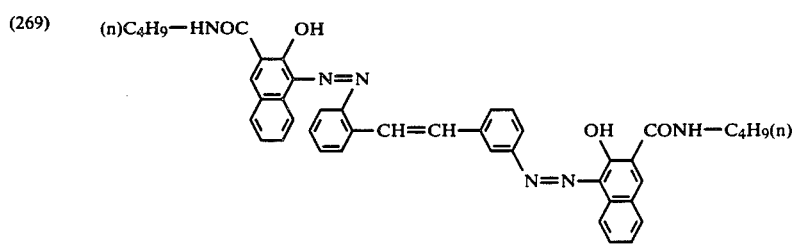 |
| (270) | 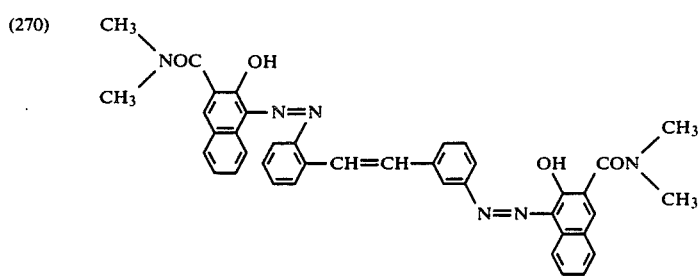 |
| (271) | 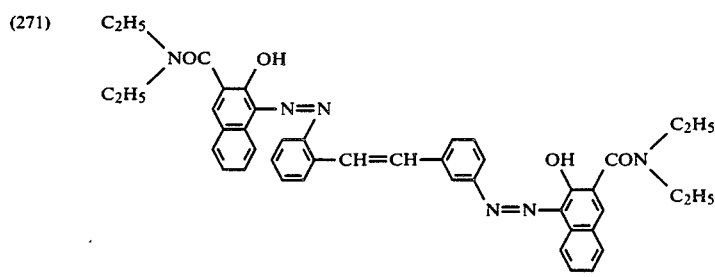 |

| Pigment No. | Formula |
|---|---|
| (272) | 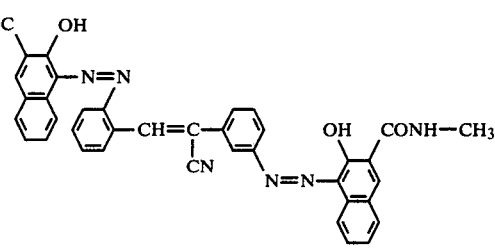 |
| (273) | 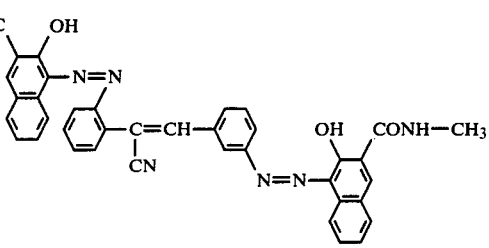 |
| (274) | 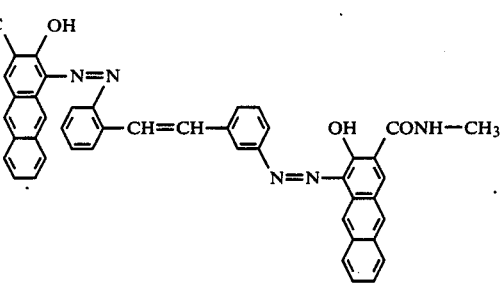 |
| (275) | 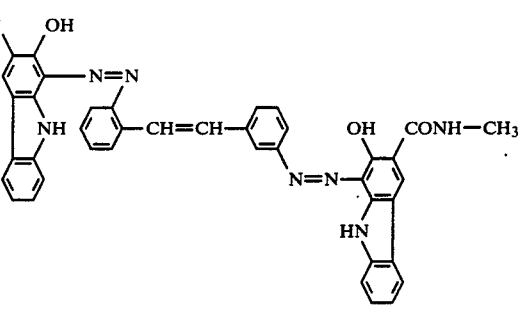 |
| (276) | 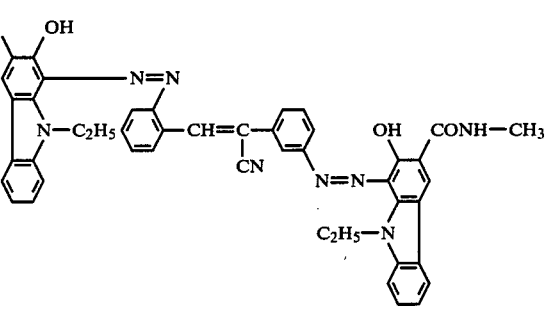 |

-continued
| Pigment No. | Formula |
|---|---|
| (277) | 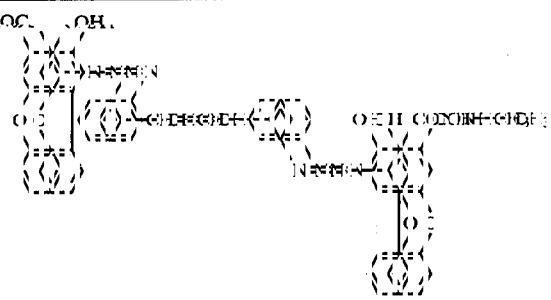 |
| (278) | 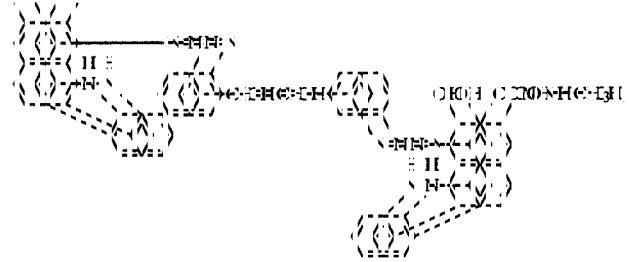 |
| (279) | 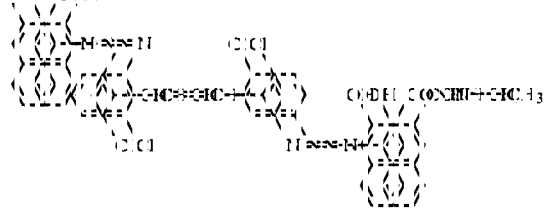 |
| (280) | 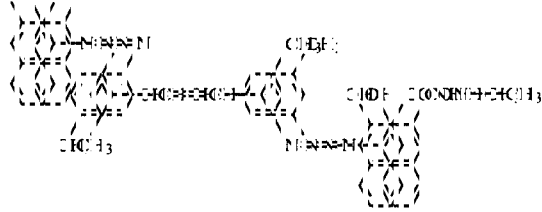 |
| (281) | 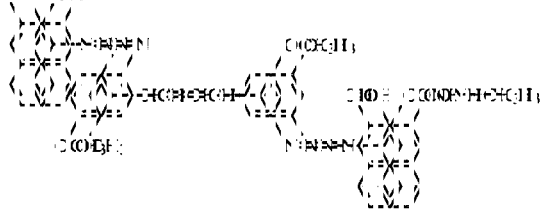 |
| (282) | 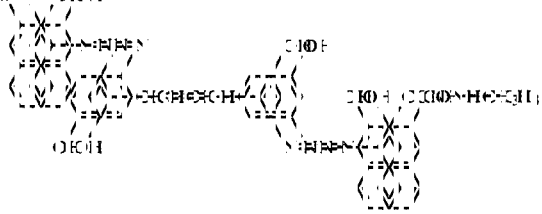 |

| Pigment No. | Formula |
|---|---|
| (283) | 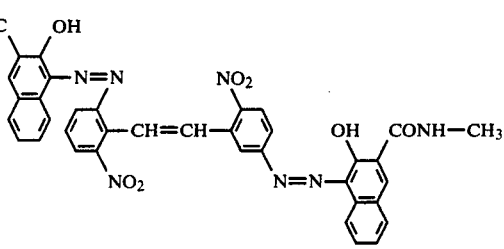 |
| (284) | 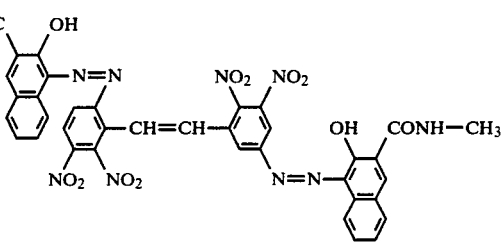 |
| (285) | 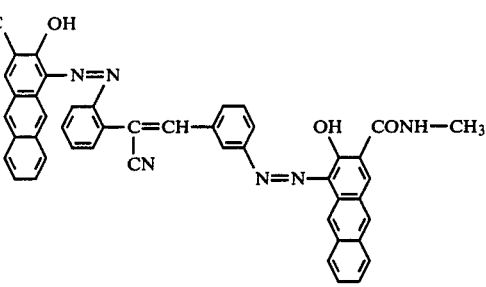 |
| (286) | 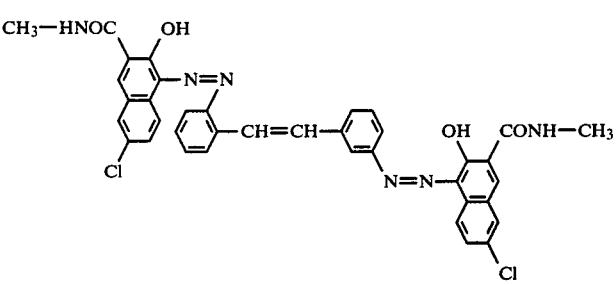 |
| (287) | 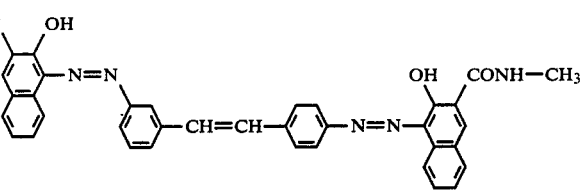 |
| (288) | 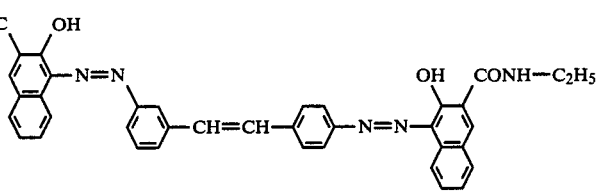 |

-continued
| Pigment No. | Formula |
|---|---|
| (289) | 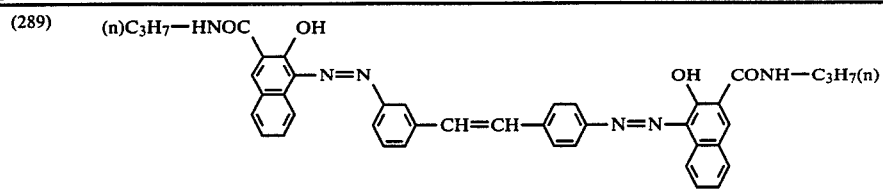 |
| (290) | 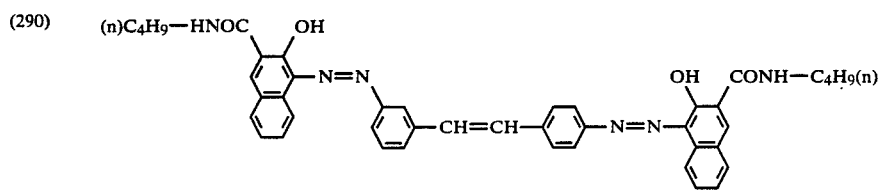 |
| (291) | 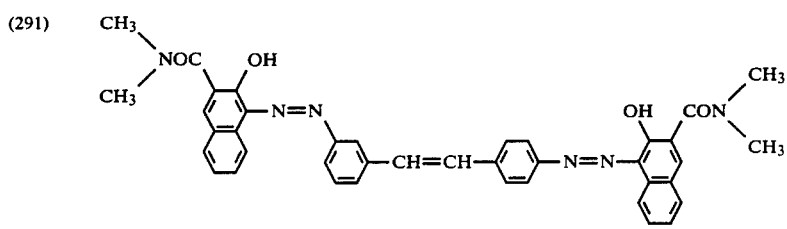 |
| (292) | 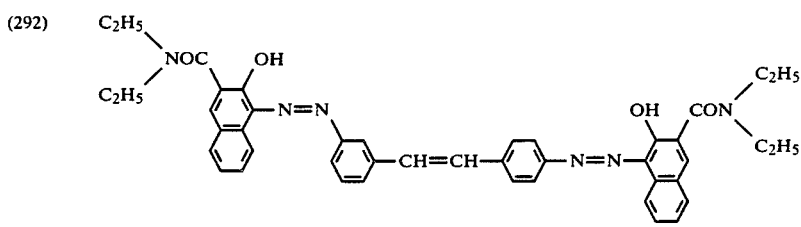 |
| (293) | 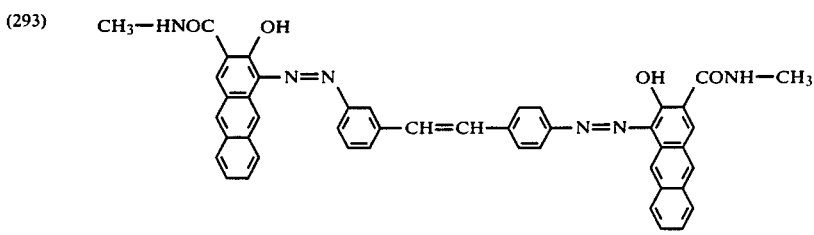 |
| (294) | 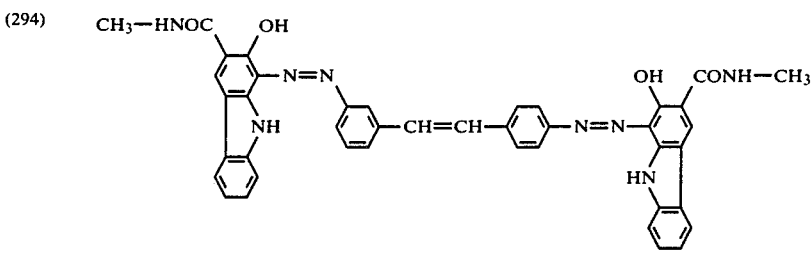 |
| (295) | 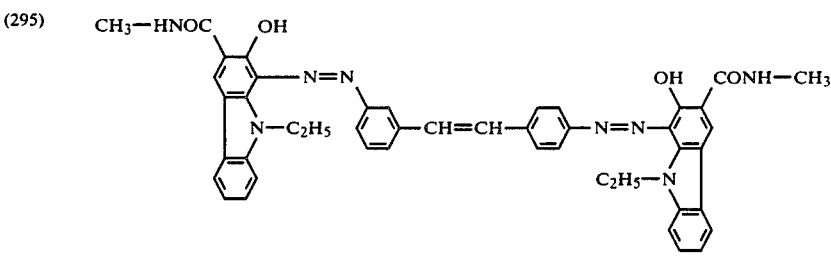 |

| Pigment No. | Formula |
|---|---|
| (296) | 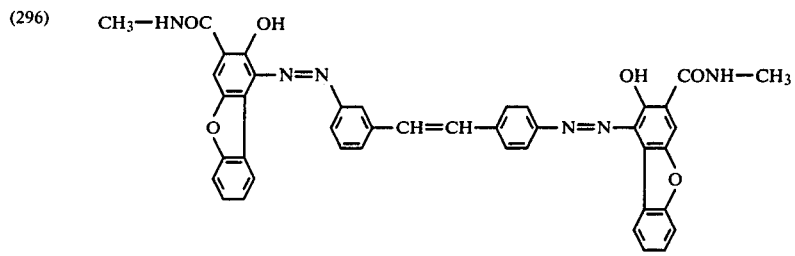 |
| (297) | 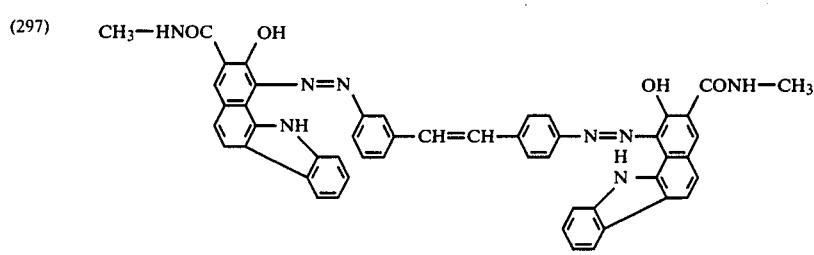 |
| (298) | 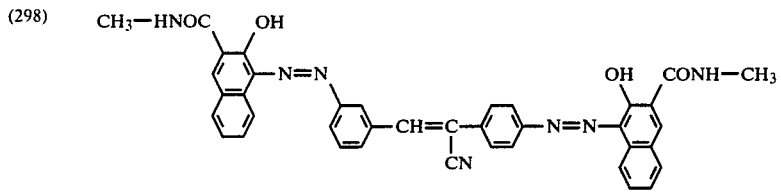 |
| (299) | 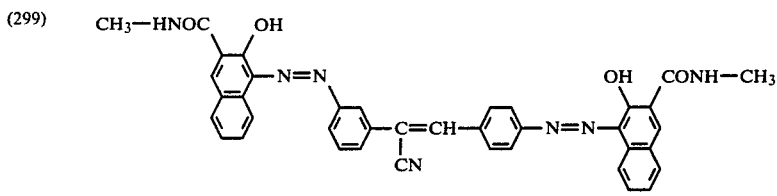 |
| (300) | 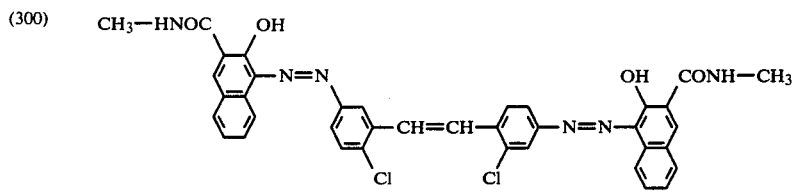 |
| (301) | 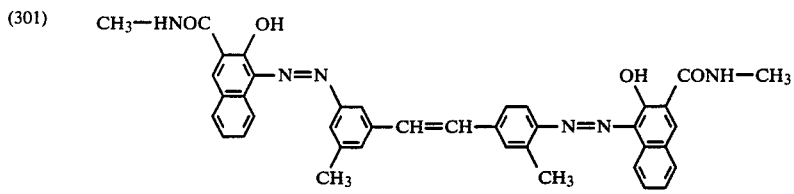 |
| (302) | 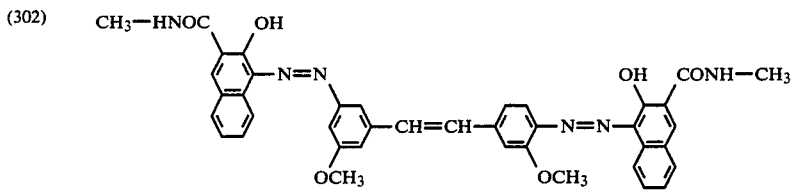 |

| Pigment No. | Formula |
|---|---|
| (310) | 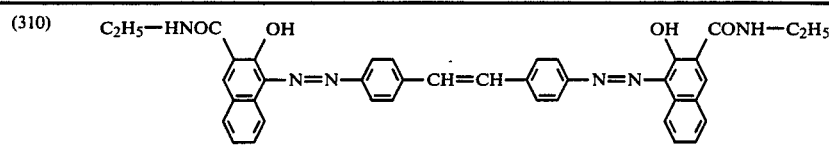 |
| (311) | 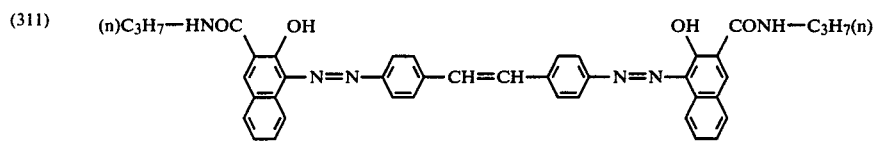 |
| (312) | 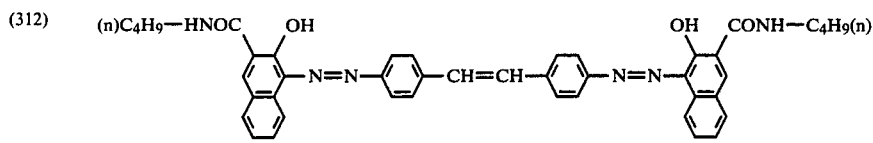 |
| (313) | 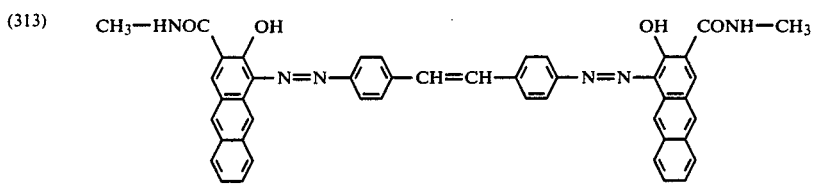 |
| (314) | 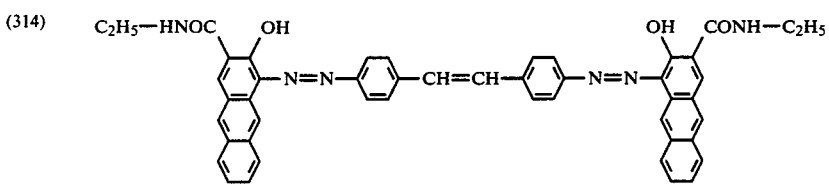 |
| (315) | 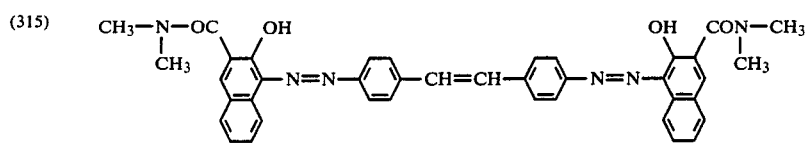 |
| (316) | 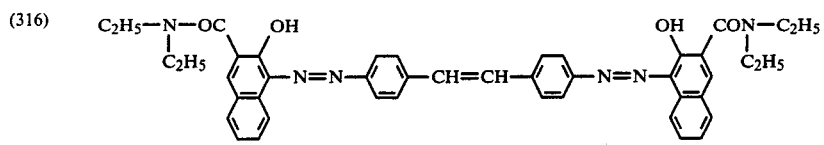 |
| (317) | 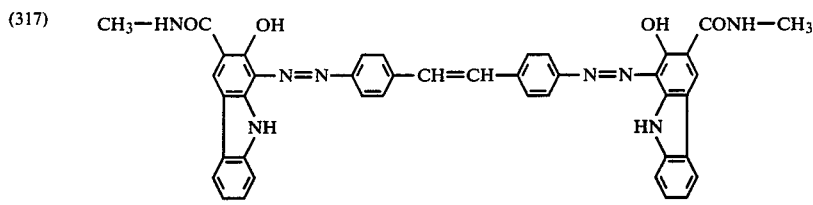 |
| (318) | 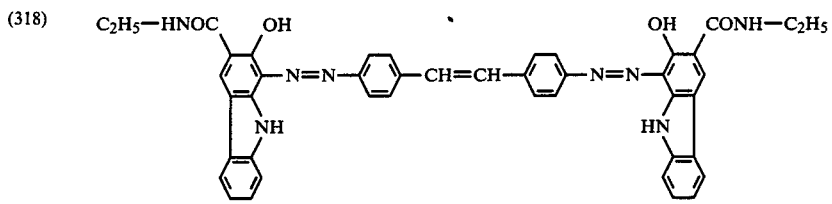 |

| Pigment No. | Formula |
|---|---|
| (319) | Bis-azo stilbene pigment: 4-[N-ethyl-carbazole] coupler with CH₃—HNOC, OH substituents on each end, linked via —N=N—C₆H₄—CH=CH—C₆H₄—N=N— |
| (320) | Bis-azo stilbene pigment with carbazole (NH) coupler bearing CH₃—HNOC and OH groups on each end, linked via —N=N(H)—C₆H₄—CH=CH—C₆H₄—N(H)=N— |
| (321) | Bis-azo stilbene pigment with dibenzofuran-type (O) coupler bearing CH₃—HNOC and OH groups, linked via —N=N—C₆H₄—CH=CH—C₆H₄—N=N— |
| (322) | Bis-azo stilbene pigment with 6-methyl-naphthol coupler (CH₃—HNOC, OH) linked via —N=N—C₆H₄—CH=CH—C₆H₄—N=N— |
| (323) | Bis-azo stilbene pigment with carbazole-NH coupler, CH₃—N(CH₃)—OC and OH substituents, linked via —N=N—C₆H₄—CH=CH—C₆H₄—N=N— |
| (324) | Bis-azo stilbene pigment with naphthol coupler (CH₃—HNOC, OH), central stilbene bearing CH₃ groups on each phenyl ring |
| (325) | Bis-azo stilbene pigment with naphthol coupler (CH₃—HNOC, OH), central stilbene bearing OCH₃ groups on each phenyl ring |
| (326) | Bis-azo stilbene pigment with naphthol coupler (CH₃—HNOC, OH), central stilbene bearing Cl groups on each phenyl ring |
| (327) | Bis-azo stilbene pigment with naphthol coupler (CH₃—HNOC, OH), central stilbene bearing NO₂ groups on each phenyl ring |

-continued

| Pigment No. | Formula |
|---|---|
| (328) |  |

Trisazo pigments of formula (3):

| Pigment No. | Formula |
|---|---|
| (329) | N−⟨C₆H₄⟩−N=N−[naphthol with OH, CONH−CH₃])₃ |
| (330) | N−⟨C₆H₄⟩−N=N−[naphthol with OH, CONH−C₂H₅])₃ |
| (331) | N−⟨C₆H₄⟩−N=N−[naphthol with OH, CONH−C₃H₇(n)])₃ |
| (332) | N−⟨C₆H₄−OCH₃⟩−N=N−[naphthol with OH, CON(CH₃)₂])₃ |
| (333) | N−⟨C₆H₄⟩−N=N−[naphthol with OH, CON(C₂H₅)₂])₃ |
| (334) | N−⟨C₆H₄⟩−N=N−[anthrol with OH, CONH−CH₃])₃ |
| (335) | N−⟨C₆H₄⟩−N=N−[carbazole-type with OH, CONH−CH₃, HN])₃ |
| (336) | N−⟨C₆H₄⟩−N=N−[fused ring with OH, CONH−CH₃, C₂H₅−N])₃ |
| (337) | N−⟨C₆H₄⟩−N=N−[carbazole with OH, CONH−CH₃, H-N])₃ |
| (338) | N−⟨C₆H₄⟩−N=N−[dibenzofuran-type with OH, OH, CONH−CH₃, O])₃ |
| (339) | N−⟨C₆H₃(NO₂)⟩−N=N−[naphthalimide with OH, N−CH₃])₃ |
| (340) | N−⟨C₆H₄⟩−N=N−[naphthalimide with OH, N−C₂H₅])₃ |
| (341) | N−⟨C₆H₄⟩−N=N−[naphthalimide with OH, N−C₂H₄OCH₃])₃ |
| (342) | N−⟨C₆H₄⟩−N=N−[naphthalimide with OH, N−C₂H₄OH])₃ |

-continued
| Pigment No. | Formula |
|---|---|
| (343) | 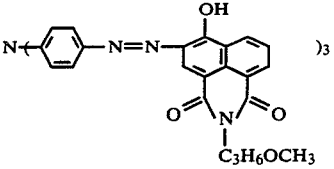 |
| (344) | 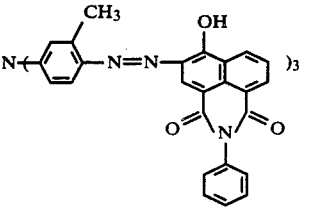 |
| (345) | 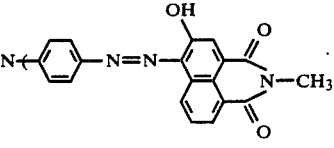 |
| (346) | 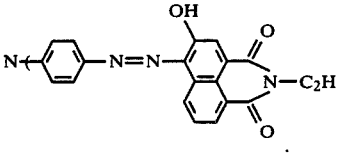 |
| (347) | 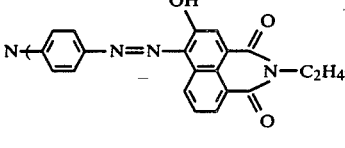 |
| (348) | 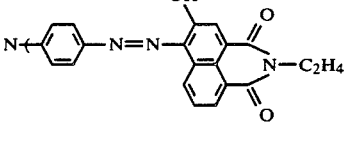 |
| (349) | 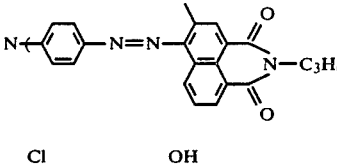 |
| (350) | 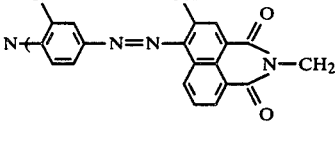 |
|  | 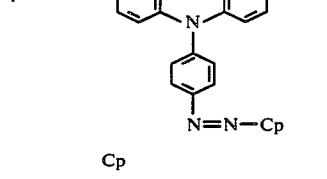 |
-continued
| Pigment No. | Formula |
|---|---|
| (351) | 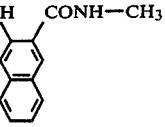 |
| (352) | 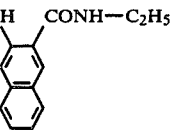 |
| (353) | 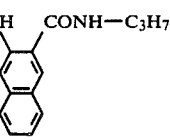 |
| (354) | 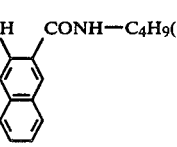 |
| (355) | 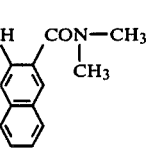 |
| (356) | 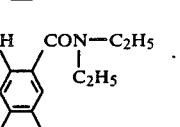 |
| (357) | 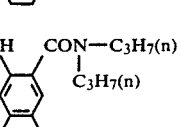 |
| (358) | 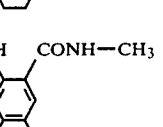 |
| (359) | 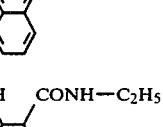 |
| (360) | 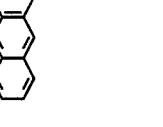 |

-continued

| Pigment No. | Formula |
|---|---|
| (361) | 3-hydroxy-2-methyl-N-methyl-4-(9-ethylcarbazol-3-yl)benzamide structure: OH, CONH—CH₃, with C₂H₅—N carbazole |
| (362) | OH, CONH—CH₃ on dibenzofuran |
| (363) | OH, CONH—CH₃ on carbazole (N—H) |
| (364) | OH on naphthalimide, N—CH₃ |
| (365) | OH on naphthalimide, N—C₂H₅ |
| (366) | OH on naphthalimide, N—C₂H₄OCH₃ |
| (367) | OH on naphthalimide, N—phenyl |
| (368) | OH on naphthalimide, N—CH₃ |

-continued

| Pigment No. | Formula |
|---|---|
| (369) | OH on naphthalimide, N—C₂H₅ |
| (370) | OH on naphthalimide, N—C₂H₅OH |
| (371) | OH on naphthalimide, N—C₃H₆OCH₃ |
| (372) | OH on naphthalimide, N—CH₂—phenyl |

Disazo pigments represented by formula (1) can be readily prepared each by tetrazotization in the usual way of a diamine represented by the formula H₂N-A₁-NH₂, wherein A₁ is as defined above, followed by reaction with a coupler defined above in the presence of an alkali to the tetrazonium either as it is or after it has been isolated in the form of fluoroborate or double salt with zinc chloride and dissolved in a suitable solvent, e.g. N,N-dimethyl-formamide or dimethylsulfoxide.

The process for the preparation of the disazo pigment represented by formula (1) used in this invention is illustrated below referring to typical examples thereof.

PREPARATION EXAMPLE 1

(Preparation of disazo pigment No. 1 cited above)

A solution of 3.54 g (0.051 mole) of sodium nitrite in 10.6 ml of water was added dropwise to a solution of 5.63 g (0.025 mole) of 3,6-diamino-9-ethylcarbazole in a mixture of 65 ml of water and 13.24 ml (0.15 mole) of conc. hydrochloric acid during 5 minutes while keeping the liquid temperature at 4.5°–7° C. The mixture was stirred at the same temperature for 30 further minutes.

The resulting solution was added dropwise to a solution of 10.57 g (0.0525 mole) of 3-hydroxy-naphthalene-2-carboxylic acid methylamide and 16.8 g (0.42 mole) of sodium hydroxide in 420 ml of water during 10 minutes while keeping the liquid temperatures at 4°–10° C. The mixture, being stirred at the same temperature for 2 further hours, was allowed to stand overnight.

The formed precipitate was filtered, washed, dried, and extracted with methyl ethyl ketone for 2.0 hours using a Soxhlet extractor, giving 12.8 g of the dry pigment.

Analysis, for $C_{38}H_{31}N_7O_4$: Calcd (%), C 70.26, H 4.78, N 15.10. Found (%), C 70.31, H 4.75, N 15.02.

PREPARATION EXAMPLE 2

(Preparation of the disazo pigment No. 97)

A solution of 3.54 g (0.051 mole) of sodium nitrite in 10.6 ml of water was added dropwise to a solution of 6.85 g (0.025 mole) of 2,2'-dintrobenzidine in a mixture of 65 ml of water and 13.24 ml (0.15 mole) of conc. hydrochloric acid at 4.5°–7° C. during 5 minutes.

The mixture, being stirred at the same temperature for 30 further minutes, was added dropwise to a solution of 10.57 g (0.0525 mole) of 3-hydroxynaphthalene-2-carboxylic acid methylamide and 16.8 g (0.42 mole) of sodium hydroxide in 420 ml of water at 4°–10° C. during 10 minutes. The mixture, being stirred at the same temperature for 2 further hours, was allowed to stand overnight.

The formed precipitate was filtered, washed, dried, and extracted with methyl ethyl ketone for 2.0 hours using a Soxhlet, giving 14.5 g of the dry pigment; yield 83%.

Analysis, for $C_{36}H_{26}N_8O_8$: Calcd. (%), C 61.89, H 3.72, N 16.05. Found (%), C 61.73, H 3.81, N 16.01.

PREPARATION EXAMPLE 3

(Preparation of the disazo pigment No. 142)

A solution of 3.54 g (0.051 mole) of sodium nitrite in 10.6 ml of water was added dropwise to a solution of 7.8 g (0.025 mole) of 1, 4-bis(4-4-aminostyryl)benzene in a mixture of 64 ml of water and 13.24 ml (0.15 mole) of conc. hydrochloric acid at 4.5°–7° C. during 5 minutes.

The mixture, being stirred at the same temperature for 30 further minutes, was added dropwise to a solution of 10.57 g (0.0525 mole) of 3-hydroxynaphthalene-2-carboxylic acid methylamide and 16.8 g (0.42 mole) of sodium hydroxide in 420 ml of water at 4°–10° C. during 10 minutes. The mixture, being stirred at the same temperature for 2 further hours, was allowed to stand overnight.

The formed precipitate was filtered, washed, dried, and extracted with methyl ethyl ketone for 2.0 hours using a Soxhlet, giving 14.7 g of the dry pigment; yield 80%.

Analysis, for $C_{46}H_{36}N_6O_2$: Calcd. (%), C 75.00, H 4.89, N 11.41. Found (%) C 75.08, H 4.81, N 11.50.

PREPARATION EXAMPLE 4

(Preparation of the disazo pigment No. 184)

A solution of 3.54 g (0.051 mole) of sodium nitrite in 10.6 ml of water was added dropwise to a solution of 3.95 g (0.025 mole) of 1,5-diaminonaphthalene in a mixture of 65 ml of water and 13.24 ml (0.15 mole) of conc. hydrochroric acid at 4.5°–7° C. during 5 minutes.

The mixture, being stirred at the same temperature for 30 more minutes, was added dropwise to a solution of 10.57 g (0.0525 mole) of 3-hydroxynaphthalene-2-carboxylic acid methylamide and 16.8 g of sodium hydroxide in 420 ml of water at 4°–10° C. during 10 minutes. The mixture, being stirred at the same temperature for 2 more hours, was allowed to stand overnight.

The formed precipitate was filtered, washed, dried and extracted with methyl ethyl ketone for 2.0 hours using a Soxhlet, giving 12.1 g of the dry pigment; yield 83%.

Analysis, for $C_{34}H_{26}N_6O_4$: Calcd. (%), C70.10, H 4.47, N 14.43. Found (%), C70.16, H 4.43, N 14.41.

PREPARATION OF EXAMPLE 5

(Preparation of the disazo pigment No. 206)

A solution of 3.54 g (0.051 mole) of sodium nitrite in 10.6 ml of water was added dropwise to a solution of 10.3 g (0.025 mole) of 9,10-bis(p-aminostyryl)anthracene in a mixture of 65 ml of water and 13.24 ml (0.15 mole) of conc. hydrochloric acid at 4.5°–7° C. during 5 minutes.

The mixture, being stirred at the same temperature for 30 more minutes, was added dropwise to a solution of 10.57 g (0.0525 mole) of 3-hydroxynaphthalene-2-carboxylic acid methylamide and 16.8 g (0.42 mole) of sodium hydroxide in 420 ml of water at 4°–10° C. during 10 minutes. The mixture, being stirred at the same temperature for 2 more hours, was allowed to stand overnight.

The formed precipitate was filtered, washed, dried, and extracted with methyl ethyl ketone for 2.0 hours using a Soxhlet, giving 16.3 g of the dry pigment; yield 78%.

Analysis, for $C_{54}H_{40}N_6O_4$: Calcd. (%), C 77.51, H 4.78, N 10.05. Found (%), C 77.55, H 4.76 N 10.01.

PREPARATION EXAMPLE 6

(Preparation of the disazo pigment No. 232)

A solution of 3.54 g (0.051 mole) of sodium nitrite in 10.6 ml of water was added dropwise to a solution of 11.4 g (0.025 mole) of 2,5-bis[p-(p-aminostyryl)phenyl]-1,3,4-oxadiazole in a mixture of 65 ml of water and 13.24 ml (0.15 mole) of conc. hydrochloric acid at 4.5°–7° C. during 5 minutes.

The mixture, being stirred at the same temperature for 30 further minutes, was added dropwise to a solution of 10.57 g (0.0525 mole) of 3-hydroxynaphthalene-2-carboxylic acid methylamide and 16.8 g (0.42 mole) of sodium hydroxide in 420 ml of water at 4°–10° C. during 10 minutes. The mixture, being stirred at the same temperature for 2 further hours, was allowed to stand overnight.

The formed precipitate was filtered, washed, dried, and extracted with methyl ethyl ketone for 2.0 hours using a Soxhlet, giving 15.8 g of the dry pigment; yield 72%.

Analysis, for $C_{54}H_{40}N_8O_5$: Calcd. (%), C 73.64, H 4.54, N 12.73. Found (%), C 73.69, H 4.51, N 12.75.

Disazo pigments represented by formula (2) can also be readily prepared each by tetratization in the usual way of a diamine represented by the formula

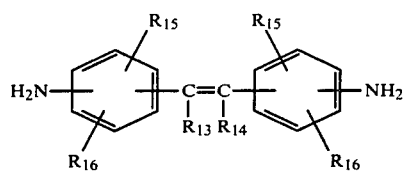

wherein $R_{13}$, $R_{14}$, $R_{15}$ and $R_{16}$ are as defined above, followed by coupling of the tetrazonium in the same ways as in the preparation of the disazo pigment of formula (1).

The process for the preparation of the disazo pigment of formula (2) used in this invention is illustrated below referring to typical examples thereof.

PREPARATION EXAMPLE 7

(Preparation of the disazo pigment No. 266)

A solution of 3.54 g (0.051 mole) of sodium nitrite in 10.6 ml of water was added dropwise to a solution of 5.3 g (0.025 mole) of 2,3'-diamino-trans-stilben in a mixture of 65 ml of water and 13.2 ml (0.15 mole) of conc. hydrochloric acid at 4.5°–7° C. during 5 minutes.

The mixture, being stirred at the same temperature for 30 more minutes, was added dropwise to a solution of 10.57 g (0.0525 mole) of 3-hydroxynaphthalene-2-carboxylic acid methylamide and 16.8 g (0.42 mole) of sodium hydroxide in 420 ml of water at 4°–10° C. during 10 minutes. The mixture, being stirred at the same temperature for 2 more hours, was allowed to stand overnight.

The formed precipitage was filtered, washed, dried, and extracted with methyl ethyl ketone for 2.0 hours using a Soxhlet, giving 10.0 g of the dry pigment; yield 63%.

Analysis, for $C_{38}H_{30}N_6O_4$: Calcd. (%), C 71.92; H 4.73, N 13.25. Found. (%), C 71.90, H 4.71, N 13.26.

PREPARATION EXAMPLE 8

(Preparation of the disazo pigment No. 287)

A solution of 3.54 g (0.051 mole) of sodium nitrite in 10.6 ml of water was added dropwise to a solution of 5.3 g (0.025 mole) of 3,4'-diamino-trans-stilben in a mixture of 65 ml of water and 13.24 ml (0.15 mole) of conc. hydrochloric acid at 4.5°–7° C. during 5 minutes.

The mixture, being stirred at the same temperature for 30 further minutes, was added dropwise to a solution of 10.57 g (0.0525 mole) of 3-hydroxynaphthalene-2-carboxylic acid methylamide and 16.8 g (0.42 mole) of sodium hydroxide in 420 ml of water at 4°–10° C. during 10 minutes. The mixture, being stirred at the same temperature for 2 further hours, was allowed to stand overnight.

The formed precipitate was filtered, washed, dried, and extracted with methyl ketone for 2.0 hours using a Soxhlet, giving 11.4 g of the dry pigment; yield 72%.

Analysis, for $C_{38}H_{30}N_6O_4$: Calcd. (%), C 71.92, H 4.73, N 13.25. Found (%), C 71.98, H 4.68, N 13.22.

PREPARATION EXAMPLE 9

(Preparation of the pigment No. 309)

A solution of 3.54 g (0.051 mole) of sodium nitrite in 10.6 ml of water was added dropwise to a solution of 5.25 g (0.025 mole) of 4,4'-diamino-trans-stilben in a mixture of 63 ml of water and 13.24 ml (0.015 mole) of conc. hydrochloric acid at 4.5°–7° C. during 5 minutes.

The mixture, being stirred at the same temperature for 30 more minutes, was added dropwise to a solution of 10.57 g (0.0525 mole) of 3-hydroxynaphthalene-2-carboxylic acid methylamide and 16.8 g (0.42 mole) of sodium hydroxide in 420 ml of water at 4°–10° C. during 10 minutes. The mixture, being stirred at the same temperature for 2 more hours, was allowed to stand overnight.

The formed precipitate was filtered, washed, dried, and extracted with methyl ethyl ketone for 2.0 hours using a Soxhlet, giving 12.8 g of the dry pigment; yield 81%.

Analysis, for $C_{38}H_{30}N_6O_3$: Calcd. (%), C 71.92, H 4.73, N 13.25. Found (%), C 71.88, H 4.70, N 13.28.

Trisazo pigments represented by formula (3) can also readily prepared each by hexazotization in the usual way of a triamine represented by the formula

wherein $A_2$ is as defined above, followed by coupling in the same ways as in the preparation of the disazo pigment of formula (1).

PREPARATION EXAMPLE 10

(Preparation of the trisazo pigment No. 329)

A solution of 5.31 g (0.077 mole) of sodium nitrite in 15.9 ml of water was added dropwise to a solution of 7.25 g (0.025 mole) of 4,4',4''-triaminotriphenylamine in a mixture of 63 ml of water and 13.24 ml (0.15 mole) of conc. hydrochloric acid at 4.5°–7° C. during 5 minutes.

The mixture, being stirred at the same temperature for 30 further minutes, was added dropwise to solution of 16.08 g (0.080 mole) and 22.0 g (0.55 mole) of sodium hydroxide in 420 ml of water at 4°–10° C. during 10 minutes. The mixture, being stirred at the same temperature for 2 more hours, was allowed to stand overnight.

The formed precipitate was filtered, washed, dried, and extracted with methyl ethyl ketone for 2.0 hours using a Soxhlet, giving 19.7 g of the dry pigment; yield 85%.

Analysis, for $C_{54}H_{42}N_{10}O_6$; Calcd. (%), C 69.98, H 4.54, N 15.12. Found (%), C 69.88, H 4.57, N 15.09.

PREPARATION EXAMPLE 11

(Preparation of the triazo pigment No. 351)

A solution of 5.31 g (0.077 mole) of sodium nitrite in 15.9 ml of water was added dropwise to a solution of 7.2 g (0.025 mole) of 3,6-diamino-9-(4-aminophenyl) carbazole in a mixture of 67 ml of water and 13.24 ml (0.15 mole) of conc. hydrochloric acid at 4.5°–7° C. during 5 minutes.

The mixture, being stirred at the same temperature for 30 more minutes, was added dropwise to a solution of 16.08 g (0.080 mole) of 3-hydroxynaphthalene-2-carboxylic acid methylformamide and 21.2 g (0.53 mole) of sodium hydroxide in 420 ml of water at 4°–10° C. during 10 minutes. The mixture, being stirred at the same temperature for 2 more hours, was allowed to stand overnight.

The formed precipitate was filtered, washed, dried, and extracted with methyl ethyl ketone for 2.0 hours using a Soxhlet, giving 17.2 g of the dry pigment; yield 78%.

Analysis, for $C_{54}H_{40}N_7O_6$: Calcd. (%), C 73.45, H 4.54, N 11.11. Found (%), C 73.48, H 4.55, N 11.07.

Other azo pigments used in this invention can be prepared in the same way as in these Preparation Examples.

Electrophotographic photosensitive members comprising organic pigments on a conductive layer include the following types.

(1) As disclosed in Japanese Patent Publication No. 1667/1977, a type having a layer of pigment dispersed in a binder on a conductive layer.

(2) As disclosed in Japanese Patent Publication No. 18545/1972 and Japanese Patent Kokai No. 30328/1972, a type having a layer formed of pigment dispersed in a charge-transporting material or in a charge-transporting medium consisting of a charge-transparting material and an insulating binder (or consisting merely of a binder acting itself as a charge-transporting material), on a conductive layer.

(3) As disclosed in Japanese Patent Kokai No. 105537/1974, a type comprising a conductive layer, a charge generation layer containning an organic pigment, and a charge transport layer.

(4) As disclosed in Japanese Patent Kokai No. 91648/1974, a type having an organic pigment-containing charge-transfer complex.

The electrophotographic photosensitive member of this invention is characterized by containing the foregoing azo pigments, though applicable to any of the above types of photosensitive members, desirable to be used for the types (2), (3) and (4) for the purpose of enhancing the transport efficiency of charge carriers generated by light absorption in the azo pigment. The application of the present azo pigments to the type (3) of photosensitive member wherein the charge carrier-generating and transporting functions are separated is most desirable for making the most of characteristics of this type of pigments.

Accordingly, referring now to the type (3) of photosensitive member, more detailed description is given.

It is essential for this type of photosensitive member to have a layer construction of conductive layer, charge generation layer, and charge transport layer. While the charge generation layer may be laid on either upper or lower side of the charge transport layer, a type of photosensitive member for repeated uses is preferred to have a construction comprising a conductive layer, charge generation layer, and charge transport layer, laminated in this order from bottom to top, in view chiefly of the mechanical strength and occasionally of the charge-ability. A bond layer can be laid between the conductive layer and either the charge generation layer or the charge transport layer if necessary for the purpose of improving the adhesion between them.

Materials for use as the conductive layer include aluminum or other metal plates or foils, plastic films metallized with aluminum or other metal, aluminum foil-laminated paper, conductivized paper, etc.

Materials effectively used for the bond layer include resins such as casein, poly(vinyl alcohol), water-soluble ethylene-acrylic acid copolymer, nitrocellulose, etc. Suitable thickness of the bond layer is $0.1 \geq 5\mu$, particularly $0.5-3\mu$.

The charge generation layer is prepared on the conductive layer or on the bond layer formed thereupon, by coating a finely devided azo pigment mentioned above without using a binder or by coating such an azo pigment dispersed in a suitable binder solution, if necessary, and drying. For dispersing the azo pigments, known means such as ball mills and attritors are available, whereby particle size of the pigment are reduced to $5\mu$ or less, preferably $2\mu$ or less, and most preferably $0.5\mu$ or less.

The azo pigments can also be coated in the form of solution in an amine solvent such as ethylenediamine.

For the coating, usual methods are used such as blade coating, Meyer bar coating, spray coating, and dip coating.

Thickness of the charge generation layer is generally up to $5\mu$, preferably 0.01 to $1\mu$. When a binder is used for the charge generation layer, its content in the charge generation layer is desirably up to 80%, preferably up to 40%, by weight, because excessive binder contents have an adverse effect on the sensitivity.

Binders for use in the charge generation layer include various types of resin such as poly(vinyl butyral), poly(vinyl acetate), polyesters, polycarbonates, phenoxy resins, acrylic resins, polyacrylamides, polyamides, polyvinylpyridine, cellulosic resins, urethane resins, epoxy resins, casein, poly(vinyl alcohol), and the like.

The charge transport layer is laid on the charge generation layer formed in the above-mentioned way. The charge transport layer can be prepared by coating a charge-transporting material in usual ways, with it dissolved in a suitable binder solution if it has no film-forming property.

The charge-transporting materials are classified into electron-transporting materials and hole-transporting materials.

The electron-transporting materials include electron attractive substances such as chloranil, bromanil, tetracyanoethylene, tetracyanoquinodimethane, 2,4,7-trinitro-9-fluorenone, 2,4,5,7-tetranitro-9-fluorenone, 2,4,7-trinitro-9-dicyanomethylenefluorenone, 2,4,5,7-tetranitroxanthone, 2,4,8-trinitrothioxanthone, and polymers derived from these compounds.

The hole-transporting materials include pyrene, N-ethylcarbazole, N-isopropylcarbazole, N-methyl-N-phenylhydrazino-3-methylidene-9-ethylcarbazole, N,N-diphenylhydrazino-3-methylidene-9-ethylcarbazole, N,N-diphenylhydrazino-3-methylidene-10-ethylphenothiazine, N,N-diphenylhydrazino-3-methylidene-10-ethylphenoxazine; hydrazones such as p-diethylaminobenzaldehyde-N,N-diphenylhydrazone, p-diethylaminobenzaldehyde-N-α-naphthyl-N-phenylhydrazone, p-(1-pyrrolidinyl)benzaldehyde-N,N-diphenylhydrazone, 1,3,3-trimethylindolenine-ω-aldehyde-N,N-diphenylhydrazone, p-diethylbenzaldhyde-3-methylbenzthiazolinone-2-hydrozone; 2,5-bis(p-diethylaminophenyl)-1,3,4-oxadiazole; pyrazolines such as 1-phenyl-3-(p-diethylaminostyryl)-5-(p-diethylaminophenyl)pyrazoline, 1-[quinolyl(2)]-3-(p-diethylaminostyryl)-5-(p-diethylaminophenyl)pyrazoline, 1-[pyridyl(2)]-3-(p-diethylaminostyryl)-5-(p-diethylaminophenyl)pyrazoline, 1-[6-methoxypyridyl(2)]-3-(p-diethylaminostyryl)-5-(p-diethylaminophenyl)pyrazoline, 1-[pyridyl (3)]-3-(p-diethylaminostyryl)-5-(p-diethyl-aminophenyl)pyrazoline, 1-[lepidyl (2)]-3-(p-diethylamino-styryl)-5-(p-diethylaminophenyl)pyrazoline, 1-[pyridyl (2)]-3-(p-diethylaminostyryl)-4-methyl-5-(p-diethylamino-phenyl)pyrazoline, 1-[pyridyl (2)]-3-(α-methyl-p-diethyl-aminostyryl-5-(p-diethylaminophenyl) pyrazoline, 1-phenyl-3-(p-diethylaminostyryl)-4-methyl-5-(p-diethylaminophenyl)pyrazoline, 1-phenyl-3-(α-benzyl-p-diethylaminostyryl)-5-(p-diethylaminophenyl)pyrazoline, and spiropysazoline; oxazole compounds such as 2-(p-diethylaminostyryl)-6-diethylaminobenzoxazole and 2-(p-diethylaminophenyl)-4-(p-dimethylaminophenyl)-5-(2-chlorophenyl)oxazole; thiazole compounds such as 2-(p-diethylaminostyryl)-6-diethylaminobenzothiazole; triarylmethanes such as bis(4-diethylamino-2-methylphenyl)-phenylmethane; polyarylalkanes such as 1,1-bis(4-N,N-diethylamino-2-methylphenyl)heptane and 1,1,2,2-tetrakis(4-N,N-dimethylamino-2-methylphenyl)ethane; triphenylamine; and resins such as poly(N-vinylcarbazole), polyvinylpyrene, polyvinylanthracene, polyvinylacridine, poly(9-vinylphenylanthracene), pyrene-formaldehyde resin, and ethylcarbazole-formaldehyde resin. The charge-transporting materials in this invention are not limited to the above-cited compounds and can be used singly or in combination of two or more. Thickness of the charge transport layer is $5-30\mu$, preferably $8-20\mu$.

The binders for use in the charge transport layer include acrylic reins, polystyrene, polyesters, polycarbonates, etc. For low molecular weight hole-transporting materials, the above-cited hole-transporting polymers such as poly(N-vinylcarbazole) can be used as a binder. On the other hand, for low molecular weight electron-transporting materials, there may be used polymers, as a binder prepared from electron-transporting monomers as disclosed in U.S. Pat. No. 4122113.

When the photosensitive member comprising a conductive layer, charge generation layer, and charge transport layer laminated in this order is operated, the surface of the charge transport layer needs to be positively charged if it is formed from an electron-transporting material. On image exposure of the photosensitive member after positive charging thereof, in the light-exposed areas electrons generated in the charge generation layer are injected into the charge transport layer and then arrive the surface thereof, where positive charges are neutralized with the electrons to decay the surface potential, thus producing an electrostatic contrast between the light-exposed and light-unexposed areas. The produced electrostatic latent image, on development with a negative-chargeable toner, turns into a visible image, which can be fixed directly or after being transferred to paper or plastic film. It is also possible that the electrostatic latent image on the photosensitive mamber is transferred to the insulating layer of transfer paper, then developed, and fixed. Any of known developers, development processes, and fixing processes may be adopted, viz. there are no particular restrictions thereupon.

On the other hand, if the charge transport layer is formed from a hole-transporting, its surface needs to be negatively charged. On image exposure of the photosensitive member negatively charged, holes generated in the light-exposed areas of the charge generation layer act similarly to the electrons mentioned above, resulting in an electrostatic latent image. For developing this, the use of a positive-chargeable toner is necessary contrary to the case of the electron-transporting material-based photosensitive member.

A photosensitive member of type (1) in this invention is prepared by dispersing the azo pigment in a solution of such insulating binder as used for the charge transport layer of the photosensitive member of type (3) and by coating the resulting dispersion on a conductive substrate, followed by drying.

A photosensitive member of type (2) is prepared by dissolving a charge-transporting material and an insulating binder, both similar to those used in the charge transport layer of the type (3) of photosensitive member, in a suitable solvent, dispersing the azo pigment in the resulting solution, and coating the dispersion on a conductive substrate, followed by drying.

A photosensitive member of type (4) is prepared by combining an electron-transporting material and a hole-transporting material, both mentioned referring to the type (3) of photosensitive member, to form a solution of a charge transfer complex, dispersing the azo pigment in the resulting solution, and coating the dispersion on a conductive substrate, followed by drying.

For any of these types of photosensitive member, at least one azo pigment represented by formula (1), (2) or (3) is used, and if necessary, a pigment different in light absorption spectrum can be additionally used to enhance the sensitivity of photosensitive member, two or more of the azo pigments can be used in combination for the purpose of obtaining a panchromatic photosensitive member, or the azo pigment can be used in combination with a charge-generating material selected from known dyes and pigments.

The electrophotographic photosensitive member of this invention can be used not only in electrophotographic copying machines but also over a wide field of electrophotographic applications such as those to laser printers and CRT printers.

This invention will be illustrated with reference to the following Examples:

EXAMPLES 1–9

An aqueous solution of poly(vinyl alcohol) was coated on an aluminum plate 100$\mu$ thick and dried to form a bond layer of coating weight 0.8 g/m$^2$.

A dispersion of 5 g of a pigment shown in Table 1 in a solution of 10 g of a polyester (registered trade mark: Polyester Adhesive 49,000; mfd. by Du Pont de Nemours & Co.; solid content 20 wt%) in 80 ml of tetrahydrofuran was coated on the bond layer and dried to form a charge generation layer of coating weight 0.20 g/m$^2$.

A solution of 5 g of 1-[pyridyl-(2)]-3-(p-diethylaminostyryl)-5-(p-diethylaminophenyl)pyrazoline and 5 g of a poly(methyl methacrylate) resin (number average mol. wt. about 100,000) in 70 ml of benzene was coated on the charge generation layer and dried to form a charge transport layer of coating weight 10 g/m$^2$.

Electrophotographic photosensitive members prepared in this way using the azo pigments shown in Table 1 were corona-charged at $\ominus$5 KV in the static fashion by using an electrostatic copying paper testing machine (Model SP-428, mfd. by Kawaguchi Denki K. K.), retained for 10 seconds in the dark, and exposed to light at an intensity of 5 lux to examine their charge bearing characteristics.

The results are shown in Table 1, wherein $V_o$ is the original potential (volt), $R_v$ is the potential retention (%) after 10-second standing in the dark, and E1/2 is exposure quantity (lux.sec) for halving the original potential.

TABLE 1

| Example No. | Azo pigment | $V_o$ (volt) | $R_v$ (%) | $E_{\frac{1}{2}}$ (lux · sec) |
|---|---|---|---|---|
| 1 | No. (1) | −550 | 89 | 5.7 |
| 2 | No. (69) | −570 | 90 | 5.3 |
| 3 | No. (142) | −590 | 92 | 4.8 |
| 4 | No. (184) | −540 | 90 | 6.0 |
| 5 | No. (266) | −590 | 88 | 5.2 |
| 6 | No. (287) | −600 | 89 | 5.0 |
| 7 | No. (309) | −590 | 91 | 4.0 |
| 8 | No. (329) | −580 | 90 | 4.3 |
| 9 | No. (351) | −560 | 90 | 5.9 |

EXAMPLES 10 AND 11

An aqueous solution of poly(vinyl alcohol) was coated on an aluminum plate 100$\mu$ thick and dried to form a bond layer of coating weight 0.8 g/m$^2$.

A dispersion of 5 g of a pigment shown in Table 2 in a solution of 10 g of the same polyester as used in Examples 1–9 in 80 ml of tetrahydrofuran was coated on the bond layer and dried to form a charge generation layer of coating weight 0.20 g/m$^2$.

A solution of 5 g of a hydrazone compound represented by the formula

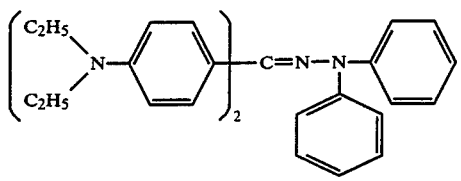

and 5 g of the same poly(methyl methacrylate) as used in Examples 1–9 in 70 ml of benzene was coated on the charge generation layer and dried to form a charge transport layer of coating weight 10 g/m².

Charge bearing characteristics of the photosensitive members thus prepared using the pigments shown in Table 2 were measured in the same manner as in Example 1. The results are shown in Table 2.

TABLE 2

| Example No. | Azo pigment | $V_o$ (volt) | $R_v$ (%) | $E_{\frac{1}{2}}$ (lux · sec) |
|---|---|---|---|---|
| 10 | No. 206 | −580 | 90 | 5.3 |
| 11 | No. 232 | −570 | 92 | 5.0 |

EXAMPLES 12–22

On each charge generation layer formed in Examples 1–11, a solution of 5 g of 2,4,7-trinitro-9-fluorenone and 5 g of a polycarbonate of bisphenol A (mol. wt. about 300,000) in 70 ml of tetrahydrofuran was coated and dried to form a charge transport layer of coating weight 10 g/m².

Charge bearing characteristic of the photosensitive members thus prepared were measured in the same manner as in Example 1 but charging positively. The results are shown in Table 3.

TABLE 3

| Example No. | Charge generation layer | $V_o$ (volt) | $R_v$ (%) | $E_{\frac{1}{2}}$ (lux · sec) |
|---|---|---|---|---|
| 12 | The layer of Example 1 | +510 | 88 | 12.7 |
| 13 | The layer of Example 2 | +500 | 84 | 13.3 |
| 14 | The layer of Example 3 | +540 | 89 | 10.6 |
| 15 | The layer of Example 4 | +520 | 87 | 11.2 |
| 16 | The layer of Example 5 | +480 | 89 | 13.1 |
| 17 | The layer of Example 6 | +500 | 87 | 11.3 |
| 18 | The layer of Example 7 | +530 | 86 | 11.2 |
| 19 | The layer of Example 8 | +490 | 83 | 11.5 |
| 20 | The layer of Example 9 | +500 | 87 | 10.6 |
| 21 | The layer of Example 10 | +490 | 88 | 11.9 |
| 22 | The layer of Example 11 | +470 | 89 | 11.1 |

EXAMPLES 23–180

An aqueous solution of poly(vinyl alcohol) was coated on an aluminum layer vacuum-deposited on a polyethylene terephthalate film and dried to form a bond layer of coating weight 1.2 g/m².

A dispersion of 5 g of an azo pigment shown in Table 4 in a solution of 2 g of a butyral resin (degree of butyral conversion 63 mole %) in 95 ml of ethanol was coated on the bond layer and dried to form a charge generation layer of coating weight 0.2 g/m².

A solution of 5 g of 1-phenyl-3-(p-diethylaminostyryl)-5-(p-diethylaminophenyl)pyrazoline and 5 g of the same polycarbonate as used in Example 2 in 70 ml of tetrahydrofuran was coated on the charge generation layer and dried to form a charge transport layer of coating weight 11 g/m².

Charge bearing characteristics of the photosensitive members thus prepared using the azo pigment shown in Table 4 were measured in the same manner as in Example 1. The results are shown in Table 4.

TABLE 4

| Example No | Azo pigment | $V_o$ (volt) | $R_v$ (%) | $E_{\frac{1}{2}}$ (lux · sec) |
|---|---|---|---|---|
| 23 | No. (1) | −530 | 89 | 6.2 |
| 24 | No. (2) | −500 | 87 | 8.7 |
| 25 | No. (5) | −520 | 90 | 7.7 |
| 26 | No. (7) | −580 | 91 | 4.5 |
| 27 | No. (11) | −570 | 89 | 8.8 |
| 28 | No. (13) | −520 | 88 | 6.1 |
| 29 | No. (15) | −500 | 87 | 5.3 |
| 30 | No. (17) | −530 | 90 | 5.7 |
| 31 | No. (18) | −590 | 92 | 4.8 |
| 32 | No. (19) | −580 | 92 | 4.1 |
| 33 | No. (20) | −590 | 91 | 4.6 |
| 34 | No. (23) | −520 | 88 | 8.1 |
| 35 | No. (24) | −550 | 90 | 6.5 |
| 36 | No. (27) | −500 | 87 | 8.9 |
| 37 | No. (28) | −510 | 89 | 7.3 |
| 38 | No. (29) | −520 | 89 | 7.8 |
| 39 | No. (30) | −500 | 88 | 8.7 |
| 40 | No. (31) | −550 | 90 | 5.8 |
| 41 | No. (33) | −540 | 91 | 4.9 |
| 42 | No. (34) | −580 | 90 | 4.6 |
| 43 | No. (38) | −520 | 88 | 7.9 |
| 44 | No. (40) | −530 | 89 | 8.0 |
| 45 | No. (41) | −530 | 88 | 8.5 |
| 46 | No. (42) | −550 | 90 | 4.7 |
| 47 | No. (44) | −580 | 90 | 4.2 |
| 48 | No. (45) | −590 | 90 | 4.3 |
| 49 | No. (49) | −510 | 88 | 8.6 |
| 50 | No. (50) | −550 | 89 | 5.2 |
| 51 | No. (51) | −570 | 87 | 6.7 |
| 52 | No. (52) | −520 | 89 | 6.0 |
| 53 | No. (53) | −550 | 90 | 7.2 |
| 54 | No. (55) | −580 | 90 | 4.8 |
| 55 | No. (56) | −580 | 89 | 5.2 |
| 56 | No. (60) | −500 | 88 | 8.3 |
| 57 | No. (61) | −510 | 88 | 8.0 |
| 58 | No. (62) | −510 | 89 | 7.7 |
| 59 | No. (63) | −500 | 89 | 8.5 |
| 60 | No. (64) | −580 | 90 | 4.6 |
| 61 | No. (66) | −580 | 91 | 4.3 |
| 62 | No. (68) | −520 | 90 | 7.3 |
| 63 | No. (69) | −550 | 89 | 6.6 |
| 64 | No. (73) | −500 | 88 | 8.3 |
| 65 | No. (74) | −510 | 89 | 7.6 |
| 66 | No. (75) | −560 | 90 | 7.2 |
| 67 | No. (78) | −580 | 90 | 6.1 |
| 68 | No. (83) | −570 | 89 | 5.3 |
| 69 | No. (84) | −580 | 91 | 4.5 |
| 70 | No. (85) | −520 | 88 | 7.8 |
| 71 | No. (86) | −530 | 89 | 7.2 |
| 72 | No. (91) | −550 | 91 | 6.6 |
| 73 | No. (94) | −540 | 88 | 5.3 |
| 74 | No. (97) | −590 | 91 | 4.8 |
| 75 | No. (101) | −530 | 87 | 6.2 |
| 76 | No. (102) | −540 | 88 | 5.9 |
| 77 | No. (107) | −550 | 89 | 6.0 |
| 78 | No. (111) | −560 | 90 | 6.7 |
| 79 | No. (113) | −580 | 91 | 4.1 |
| 80 | No. (117) | −550 | 88 | 6.3 |
| 81 | No. (122) | −520 | 89 | 7.1 |
| 82 | No. (125) | −550 | 88 | 5.3 |
| 83 | No. (126) | −570 | 89 | 5.0 |
| 84 | No. (130) | −520 | 88 | 7.8 |
| 85 | No. (136) | −550 | 89 | 6.1 |
| 86 | No. (139) | −540 | 90 | 6.6 |
| 87 | No. (142) | −550 | 89 | 5.9 |
| 88 | No. (143) | −500 | 88 | 7.8 |

TABLE 4-continued

| Example No | Azo pigment | $V_o$ (volt) | $R_v$ (%) | $E_{\frac{1}{2}}$ (lux · sec) |
|---|---|---|---|---|
| 89 | No. (147) | −510 | 90 | 7.7 |
| 90 | No. (148) | −550 | 90 | 5.7 |
| 91 | No. (149) | −520 | 89 | 6.1 |
| 92 | No. (150) | −510 | 88 | 6.5 |
| 93 | No. (151) | −580 | 90 | 4.6 |
| 94 | No. (152) | −590 | 91 | 4.2 |
| 95 | No. (153) | −600 | 90 | 4.0 |
| 96 | No. (155) | −570 | 90 | 5.1 |
| 97 | No. (156) | −580 | 90 | 5.0 |
| 98 | No. (157) | −580 | 91 | 4.2 |
| 99 | No. (162) | −560 | 89 | 5.7 |
| 100 | No. (163) | −580 | 90 | 5.4 |
| 101 | No. (166) | −550 | 90 | 6.0 |
| 102 | No. (167) | −580 | 90 | 6.0 |
| 103 | No. (168) | −590 | 91 | 4.0 |
| 104 | No. (169) | −530 | 89 | 7.6 |
| 105 | No. (170) | −550 | 89 | 6.6 |
| 106 | No. (171) | −570 | 90 | 5.0 |
| 107 | No. (172) | −550 | 90 | 5.8 |
| 108 | No. (175) | −560 | 89 | 4.9 |
| 109 | No. (176) | −520 | 90 | 5.8 |
| 110 | No. (178) | −550 | 92 | 4.7 |
| 111 | No. (179) | −550 | 90 | 4.0 |
| 112 | No. (181) | −550 | 88 | 6.7 |
| 113 | No. (183) | −580 | 90 | 4.8 |
| 114 | No. (184) | −520 | 89 | 6.5 |
| 115 | No. (185) | −500 | 88 | 8.8 |
| 116 | No. (188) | −500 | 89 | 7.9 |
| 117 | No. (189) | −490 | 89 | 8.9 |
| 118 | No. (190) | −540 | 90 | 6.0 |
| 119 | No. (193) | −480 | 88 | 9.2 |
| 120 | No. (194) | −500 | 89 | 6.7 |
| 121 | No. (196) | −530 | 90 | 5.8 |
| 122 | No. (200) | −520 | 90 | 6.5 |
| 123 | No. (202) | −540 | 91 | 5.3 |
| 124 | No. (266) | −580 | 89 | 5.5 |
| 125 | No. (267) | −550 | 87 | 6.1 |
| 126 | No. (270) | −560 | 90 | 6.0 |
| 127 | No. (272) | −610 | 90 | 3.8 |
| 128 | No. (274) | −550 | 89 | 6.4 |
| 129 | No. (275) | −540 | 89 | 6.0 |
| 130 | No. (277) | −510 | 89 | 6.9 |
| 131 | No. (278) | −500 | 90 | 7.2 |
| 132 | No. (281) | −580 | 90 | 4.8 |
| 133 | No. (283) | −600 | 89 | 4.3 |
| 134 | No. (285) | −550 | 90 | 6.0 |
| 135 | No. (287) | −620 | 89 | 4.4 |
| 136 | No. (288) | −540 | 88 | 6.7 |
| 137 | No. (291) | −570 | 87 | 6.2 |
| 138 | No. (293) | −530 | 88 | 6.8 |
| 139 | No. (294) | −550 | 89 | 6.5 |
| 140 | No. (296) | −530 | 88 | 6.9 |
| 141 | No. (297) | −520 | 89 | 7.5 |
| 142 | No. (298) | −630 | 90 | 4.0 |
| 143 | No. (299) | −610 | 91 | 4.8 |
| 144 | No. (300) | −630 | 90 | 3.7 |
| 145 | No. (301) | −610 | 88 | 4.0 |
| 146 | No. (302) | −600 | 89 | 4.7 |
| 147 | No. (304) | −590 | 88 | 5.2 |
| 148 | No. (306) | −570 | 90 | 5.9 |
| 149 | No. (309) | −540 | 89 | 5.3 |
| 150 | No. (310) | −510 | 88 | 7.5 |
| 151 | No. (313) | −520 | 90 | 7.2 |
| 152 | No. (315) | −590 | 91 | 4.0 |
| 153 | No. (317) | −530 | 89 | 5.0 |
| 154 | No. (320) | −550 | 89 | 5.3 |
| 155 | No. (321) | −550 | 89 | 5.7 |
| 156 | No. (325) | −580 | 90 | 4.6 |
| 157 | No. (329) | −560 | 89 | 5.8 |
| 158 | No. (330) | −510 | 88 | 7.2 |
| 159 | No. (332) | −500 | 89 | 8.3 |
| 160 | No. (334) | −550 | 90 | 6.7 |
| 161 | No. (335) | −580 | 92 | 4.8 |
| 162 | No. (337) | −520 | 88 | 7.8 |
| 163 | No. (338) | −510 | 89 | 6.4 |
| 164 | No. (340) | −560 | 90 | 4.7 |
| 165 | No. (341) | −580 | 90 | 4.3 |
| 166 | No. (346) | −570 | 89 | 5.9 |
| 167 | No. (348) | −580 | 90 | 4.3 |
| 168 | No. (349) | −580 | 88 | 4.2 |
| 169 | No. (351) | −550 | 89 | 5.3 |
| 170 | No. (352) | −500 | 87 | 7.7 |
| 171 | No. (355) | −510 | 88 | 6.0 |
| 172 | No. (358) | −540 | 90 | 5.6 |
| 173 | No. (360) | −550 | 90 | 4.8 |
| 174 | No. (362) | −520 | 88 | 7.2 |
| 175 | No. (363) | −510 | 87 | 7.4 |
| 176 | No. (364) | −530 | 90 | 6.7 |
| 177 | No. (366) | −590 | 91 | 4.1 |
| 178 | No. (368) | −540 | 90 | 6.6 |
| 179 | No. (371) | −580 | 90 | 4.0 |
| 180 | No. (372) | −510 | 89 | 7.3 |

EXAMPLES 181–200

An aqueous solution of poly(vinyl alcohol) was coated on an aluminum layer vacuum-deposited on a polyethylene terephthalate film and dried to form a bond layer of coating weight 1.2 g/m$^2$.

A dispersion of 5 g of a diazo pigment shown in Table 5 in a solution of 2 g of the same butyral resin as used in Examples 23–180 in 95 ml of ethanol was coated on the bond layer and dried to form a charge generation layer of coating weight 0.2 g/m$^2$.

A solution of 5 g of 1-[quinolino-(2)]-3-(p-diethylaminostyryl)-5-(p-diethylaminophenyl)pyrazoline and 5 g of the same polycarbonate as used in Example 2 in 70 ml of tetrahydrofuran was coated on the charge generation layer and dried to form a charge transport layer of coating weight 11 g/m$^2$.

Charge bearing characteristics of the photosensitive member thus prepared using the disazo pigments shown in Table 5 were measured in the same manner as in Example 1. The results are shown in Table 5.

TABLE 5

| Example No. | Azo pigment | $V_o$ (volt) | $R_v$ (%) | $E_{\frac{1}{2}}$ (lux · sec) |
|---|---|---|---|---|
| 181 | No. (232) | −560 | 90 | 5.7 |
| 182 | No. (233) | −540 | 90 | 6.2 |
| 183 | No. (234) | −510 | 88 | 7.0 |
| 184 | No. (236) | −550 | 89 | 6.1 |
| 185 | No. (237) | −540 | 90 | 6.5 |
| 186 | No. (238) | −580 | 91 | 5.0 |
| 187 | No. (239) | −570 | 90 | 5.1 |
| 188 | No. (241) | −570 | 88 | 5.3 |
| 189 | No. (242) | −580 | 91 | 4.8 |
| 190 | No. (243) | −540 | 89 | 6.5 |
| 191 | No. (245) | −530 | 88 | 6.6 |
| 192 | No. (247) | −520 | 88 | 7.2 |
| 193 | No. (248) | −540 | 89 | 6.9 |
| 194 | No. (251) | −570 | 91 | 5.8 |
| 195 | No. (252) | −590 | 92 | 4.6 |
| 196 | No. (255) | −540 | 87 | 7.3 |
| 197 | No. (258) | −540 | 90 | 6.9 |
| 198 | No. (259) | −570 | 91 | 6.0 |
| 199 | No. (261) | −540 | 88 | 7.2 |
| 200 | No. (263) | −560 | 89 | 6.7 |

EXAMPLES 201–217

An aqueous solution of poly(vinyl alcohol) was coated on an aluminum layer vacuum-deposited on a polyethylene terephthalate film and dried to form a bond layer of coating weight of 1.2 g/m$^2$.

A dispersion of 5 g of a disazo pigment shown in Table 6 in a solution of 2 g of a butyral resin (the same as used in Examples 23–180) in 95 ml of ethanol was coated on the bond layer and dried to form a charge generation layer of coating weight 0.2 g/m$^2$.

A solution of 5 g of 1-[pyridyl-(2)]-3-(p-diethylaminostyryl)-5-(p-diethylaminophenyl)pyrazoline and 5 g of a polycarbonate (the same as used in Examples 12–22) in 70 ml of tetrahydrofuran was coated on the charge generation layer and dried to form a charge transport layer of coating weight 11 g/m².

Charge bearing characteristic of the photosensitive members thus prepared using the disazo pigments shown in Table 6 were measured in the same manner as in Example 1. The results are shown in Table 6.

TABLE 6

| Example No. | Azo pigment | $V_o$ (volt) | $R_v$ (%) | $E_{\frac{1}{2}}$ (lux · sec) |
|---|---|---|---|---|
| 201 | No. (206) | −560 | 89 | 5.8 |
| 202 | No. (207) | −520 | 89 | 6.3 |
| 203 | No. (208) | −500 | 90 | 6.9 |
| 204 | No. (210) | −540 | 90 | 6.1 |
| 205 | No. (212) | −540 | 89 | 6.4 |
| 206 | No. (213) | −570 | 90 | 5.3 |
| 207 | No. (215) | −560 | 89 | 5.4 |
| 208 | No. (216) | −530 | 90 | 6.8 |
| 209 | No. (218) | −520 | 90 | 7.0 |
| 210 | No. (219) | −530 | 89 | 6.6 |
| 211 | No. (220) | −520 | 89 | 6.5 |
| 212 | No. (222) | −550 | 90 | 6.1 |
| 213 | No. (224) | −500 | 89 | 7.2 |
| 214 | No. (226) | −520 | 89 | 6.8 |
| 215 | No. (227) | −550 | 90 | 6.3 |
| 216 | No. (228) | −500 | 89 | 7.3 |
| 217 | No. (230) | −550 | 91 | 5.6 |

EXAMPLES 218–229

A solution of casein in aqueous ammonia was coated on a 100-μ thick aluminum plate and dried to form a bond layer of coating weight 1.0 g/m².

An azo pigment (1.0 g) shown in Table 7 was dispersed in a solution of 5 g of 2-(p-diethylaminophenyl)-4-(p-dimethylaminophenyl)-5-(2-chlorophenyl)oxazole and 5 g of a poly(N-vinylcarbazole) (number average mol. wt. about 300,000) in 70 ml of tetrahydrofuran. The dispersion was coated on the bond layer and dried to form a layer of coating weight 11 g/m².

The photosensitive members prepared in this way using the azo pigments shown in Table 7 were tested for charge bearing characteristics in the same manner as in Example 1 but charging them positively. The results are shown in Table 7.

TABLE 7

| Example No. | Azo pigment | $V_o$ (volt) | $R_v$ (%) | $E_{\frac{1}{2}}$ (lux · sec) |
|---|---|---|---|---|
| 218 | No. (1) | +570 | 85 | 9.7 |
| 219 | No. (67) | +550 | 82 | 10.5 |
| 220 | No. (142) | +560 | 87 | 10.1 |
| 221 | No. (184) | +500 | 87 | 9.8 |
| 223 | No. (206) | +520 | 85 | 10.8 |
| 224 | No. (232) | +520 | 88 | 10.7 |
| 225 | No. (266) | +520 | 87 | 10.8 |
| 226 | No. (287) | +590 | 83 | 8.8 |
| 227 | No. (309) | +540 | 83 | 8.9 |
| 228 | No. (329) | +540 | 84 | 10.3 |
| 229 | No. (351) | +550 | 83 | 9.8 |

What we claim is:

1. An electrophotographic photosensitive member characterized by a conductive layer or substrate a charge transport layer and a layer comprising a binder and at least one azo pigment represented by the following formula (1), (2) or (3):

$$(C_p-N=N)_{\overline{1}}A_1 \quad \text{Formula (1)}$$

$$\text{Formula (2)}$$

$$(C_p-N=N)_{\overline{1}}A_2 \quad \text{Formula (3)}$$

in these formulae;

A₁:

A₂:

wherein, Z is $$\begin{matrix} \diagdown \\ \diagup \end{matrix} N-R_{71}, \quad -\underset{\underset{O}{\overset{\displaystyle\|}{S}}}{\overset{\displaystyle\|}{S}}-, \quad -S-, \text{ or } \begin{matrix} \diagdown \\ \diagup \end{matrix} C=O,$$

in which R₇₁ is hydrogen, or substituted or unsubstituted alkyl;
n is 0 or 1;

$R_{21}$, $R_{22}$, $R_{61}$ and $R_{62}$ are hydrogen, alkyl, alkoxy, nitro, or hydroxyl;

$R_{31}$ and $R_{32}$ are hydrogen or alkoxy; and $R_{41}$, $R_{42}$, $R_{43}$, $R_{44}$, $R_{51}$, $R_{52}$, $R_{53}$ and $R_{54}$ are hydrogen, halogen, or organic monovalent residue:

Cp:

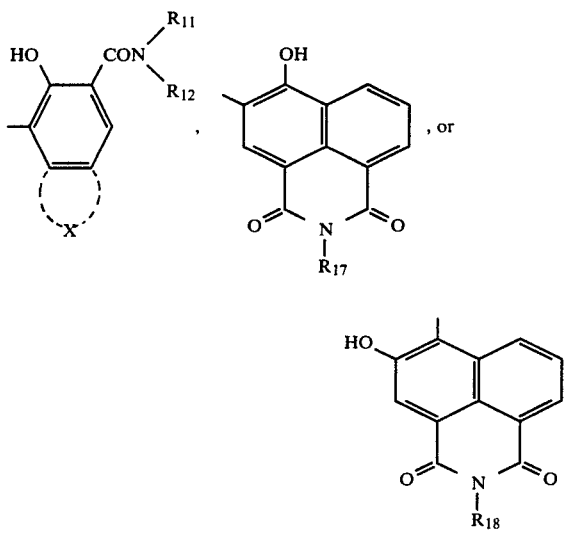

wherein X represents a residue necessary for completing an aromatic hydrocarbon ring or a hetercyclic ring, each ring being substituted or unsubstituted;

$R_{11}$ is hydrogen or alkyl;

$R_{12}$ is methyl, ethyl, or $C_3$-$C_8$ linear alkyl; and $R_{17}$ and $R_{18}$ are alkyl, aralkyl or aryl, each substituted or unsubstituted:

in formula (2); $R_{11}$, $R_{12}$ and X are as defined above; $R_{13}$ and $R_{14}$ are hydrogen or cyano; and $R_{15}$ and $R_{16}$ are hydrogen, halogen, alkyl, alkoxy, nitro, or hydroxyl.

2. An electrophotographic photosensitive member of claim 1, wherein the formulae (1), (2) and (3) $R_{11}$ is hydrogen and $R_{12}$ is methyl, ethyl, n-propyl, or n-butyl.

3. An electrophotographic photosensitive member of claim 2, wherein the formulae (1), (2) and (3) $R_{11}$ is hydrogen and $R_{12}$ is methyl.

4. An electrophotographic photosensitive member of claim 1, wherein X of the formulae (1), (2) and (3) is a residue necessary for completing a benzene ring, naphthalene ring, benzofuran ring, indole ring, or carbazole ring.

5. An electrophotographic photosensitive member of claim 4, wherein X of the formulae (1), (2) and (3) is a residue necessary for completing a benzene ring.

6. An electrophotographic photosensitive member of claim 1, wherein said charge transport layer is laid on the layer comprising a binder and at least one azo pigment represented by the formula (1), (2) or (3).

7. An electrophotographic photosensitive member of claim 6, wherein the layer comprising a binder and at least one azo pigment represented by the formula (1), (2) or (3) is laid on a conductive layer.

8. An electrophotographic photosensitive member of claim 7, wherein a bond layer is held between the conductive layer and the layer comprising a binder and at least one azo pigment represented by the formula (1), (2) or (3).

9. An electrophotographic photosensitive member of claim 1, wherein the layer comprising a binder and at least one azo pigment represented by the formula (1), (2) or (3) has a thickness of $0.01$-$1\mu$.

10. An electrophotographic photosensitive member of claim 1, wherein said charge transport layer comprises a charge-transporting material and a binder.

11. An electrophotographic photosensitive member of claim 10, wherein said charge-transporting material is an electron-transporting material.

12. An electrophotographic photosensitive member of claim 11, wherein said electron-transporting material is a compound selected from the group consisting of chloranil, bromanil, tetracyanoethylene, tetracyanoquinodimethane, 2,4,7-trinitro-9-fluorenone, 3,4,5,7-tetranitro-9-fluorenone, 2,4,7-trinitro-9-dicyanomethylenefluorenone, 2,4,5,7-tetranitroxanthone, and 2,4,8-trinitrothioxanthone.

13. An electrophotographic photosensitive member of claim 10, wherein said charge-transporting material is a hole-transporting material.

14. An electrophotographic photosensitive member of claim 13, wherein said hold-transporting material is selected from the group consisting of pyrene, carbazoles, hydrazones, oxadiazoles, pyrazolines, oxazoles, thiazoles, triarylmethanes, polyarylalkanes, triphenylamine, poly(N-vinylcarbzole), polyvinylpyrene, polyvinylanthracene, polyvinylacridine, poly(9-vinylphenylanthrancene), pyrene-formaldehyde resin, and ethylcarbazole-formaldehyde resin.

15. An electrophotographic photosensitive member of claim 14, wherein said hole-transporting material is a hydrazone or a pyrazoline.

* * * * *

UNITED STATES PATENT AND TRADEMARK OFFICE
CERTIFICATE OF CORRECTION

PATENT NO. : 4,551,404

DATED : November 5, 1985

INVENTOR(S) : MASAAKI HIRO, ET AL.

Page 1 of 4

It is certified that error appears in the above-identified patent and that said Letters Patent is hereby corrected as shown below:

Cover Page, Under "Foreign Appln. Priority Data"
    change "Jun. 18, 1981 [JP] Japan.....56-129162" to
    --Aug. 18, 1981 [JP] Japan.....56-129162--.

Abstract, page 2, change "hydroxyl R31" to --hydroxyl; R31--.

Column 2, lines 7-8, change "inversti-gated" to --investigated--.

Column 16, Pigment #32, change "$CH_2H_4OH$" to --$C_2H_4OH$--.

Column 71, pigment #268, change "N=N-" to -- N=N --.

Column 94, line 63, change "Calcd (%)," to --Calcd. (%),--.

Column 95, line 25, change "(4-4-aminostyryl)" to
    --(4-aminostyryl)--.

line 49, change "hydrochroric" to --hydrochloric--.

line 61, change "C70.10," to --C 70.10,--.

line 62, change "C70.16," to -- C 70.16,--.

line 64, change "PREPARATION OF EXAMPLE 5" to
    --PREPARATION EXAMPLE 5--.

Column 96, line 17, change "H 4.76N10.01." to
    --H 4.76,N10.01.--.

Column 97, line 9, change "precipitage" to --precipitate--.

line 13, change "C 71.92; H" to --C 71.92, H--.

UNITED STATES PATENT AND TRADEMARK OFFICE
CERTIFICATE OF CORRECTION

PATENT NO. : 4,551,404
DATED : November 5, 1985
INVENTOR(S) : MASAAKI HIRO, ET AL.

It is certified that error appears in the above-identified patent and that said Letters Patent is hereby corrected as shown below:

Column 97, line 33, change "methyl ketone" to --methyl ethyl ketone--.

line 39, change "(Preparation of the pigment No. 309" to --(Preparation of the disazo pigment No. 309)--.

lines 60-61, change "also readily" to --also be readily--.

Column 98, line 13, change "to solution" to --to a solution--.

line 27, change "the triazo" to --the trisazo--.

line 62, change "transparting" to --transporting--.

line 67, change "containning" to --containing--.

Column 99, line 28, change "charge-ability" to --chargeability-- line 33, change "aliminum" to --aluminum--.

line 40, change "$0.1 \geqq 5\mu,$" to --$0.1-5\mu,$--.

line 44, change "devided" to --divided--.

Column 100, line 28, change "p-diethylbenzaldhyde- " to --p-diethylbenzaldehyde- --.

Column 101, line 14, change "arrive the surface" to --arrive at the surface--.

Column 102, lines 35-36, change "charge/bearing" to --charge-bearing--.

UNITED STATES PATENT AND TRADEMARK OFFICE
CERTIFICATE OF CORRECTION

PATENT NO. : 4,551,404
DATED : November 5, 1985
INVENTOR(S) : MASAAKI HIRO, ET AL.

It is certified that error appears in the above-identified patent and that said Letters Patent is hereby corrected as shown below:

Column 103, line 15, change "Charge bearing" to
--Charge-bearing--.

line 33, change "Charge bearing" to
--Charge-bearing--.

Column 104, line 9, change "Charge bearing" to
--Charge-bearing--.

Column 104, line 15, change "Example No" to --Example No.--.

Column 105, line 2, change "Example No" to --Example No.--.

Column 106, line 2, change "Example No" to --Example No.--.

line 31, change "Charge bearing" to
--Charge-bearing--.

line 20, change "diazo" to --disazo--.

Column 107, line 5, change "Charge bearing" to
--Charge-bearing--.

line 43, change "charge bearing" to
--charge-bearing--.

line 62, change "substrate a" to --substrate, a--.

Column 109, lines 32-33, change "hetercy-clic" to --heterocyclic--.

Column 110, line 41, change "hold-transporting" to
--hole transporting--.

UNITED STATES PATENT AND TRADEMARK OFFICE
CERTIFICATE OF CORRECTION

PATENT NO. : 4,551,404

DATED : November 5, 1985

INVENTOR(S) : MASAAKI HIRO, ET AL.

Page 4 of 4

It is certified that error appears in the above-identified patent and that said Letters Patent is hereby corrected as shown below:

Column 110, line 47, change "phenylanthrancene" to --phenylanthracene--.

Signed and Sealed this

Twenty-fifth Day of November, 1986

Attest:

DONALD J. QUIGG

*Attesting Officer*  *Commissioner of Patents and Trademarks*